United States Patent [19]

Alexander et al.

[11] 4,106,019

[45] Aug. 8, 1978

[54] RANGE RESOLVING DOPPLER RADAR SYSTEM

[75] Inventors: Thomas F. Alexander, Rolling Hills Estates; Gary J. Griff, Anaheim, both of Calif.

[73] Assignee: Hughes Aircraft Company, Culver City, Calif.

[21] Appl. No.: 298,094

[22] Filed: Oct. 5, 1972

[51] Int. Cl.$^2$ .............................................. G01S 7/44
[52] U.S. Cl. .................................... 343/9; 343/5 DP; 343/17.1 PF; 343/100 CL
[58] Field of Search ...................... 343/5 DP, 8, 9, 17, 343/1 PF, 100 CL

[56] References Cited

U.S. PATENT DOCUMENTS

| | | | |
|---|---|---|---|
| 3,532,867 | 10/1970 | Ricketts, Jr. et al. | 343/5 DP X |
| 3,727,215 | 4/1973 | Wilmot | 343/5 DP |

*Primary Examiner*—T.H. Tubbesing
*Attorney, Agent, or Firm*—Walter J. Adam; W. H. MacAllister

[57] ABSTRACT

A system for measuring unambiguous target range for targets at high velocities in which target range and doppler frequency data from three sequential transmission dwells of radar returns are stored, each dwell having a different pulse repetition frequency (PRF). The dwell storage unit which includes three sets of dynamic registers is loaded and unloaded serially with respect to range and supplied to a 17 path doppler frequency correlator. After the three dwell storage registers have been loaded with a basic PRF plus jitter, the range interval unfolding is performed by a recirculation process in each of the registers. During recirculation the data is applied to a correlation unit, the purpose of which is to insure that the velocity of the target satisfies a 17 path algorithm across three adjacent dwells in at least one of five range azimuth profiles or paths. Because the same target velocity may cause outputs in adjacent doppler filters due to PRF jitter, the correlation utilizes a criteria that for all three possible PRF sequences the filter numbers across the three range bins and paths must be within one of each other. As the filter correlation function is capable of multiple path selection the filter path outputs are priority selected to produce a valid target. The final output from the system is a verification that the data in the three range bins of interest satisfies the seventeen path correlation algorithm formed of three dwells and three adjacent range bins with a possible PRF jitter of one filter in each range bin.

15 Claims, 23 Drawing Figures

45° Target

90° Target

Summation of
45° Target in
45° Filter

Summation of
90° Target in
45° Filter

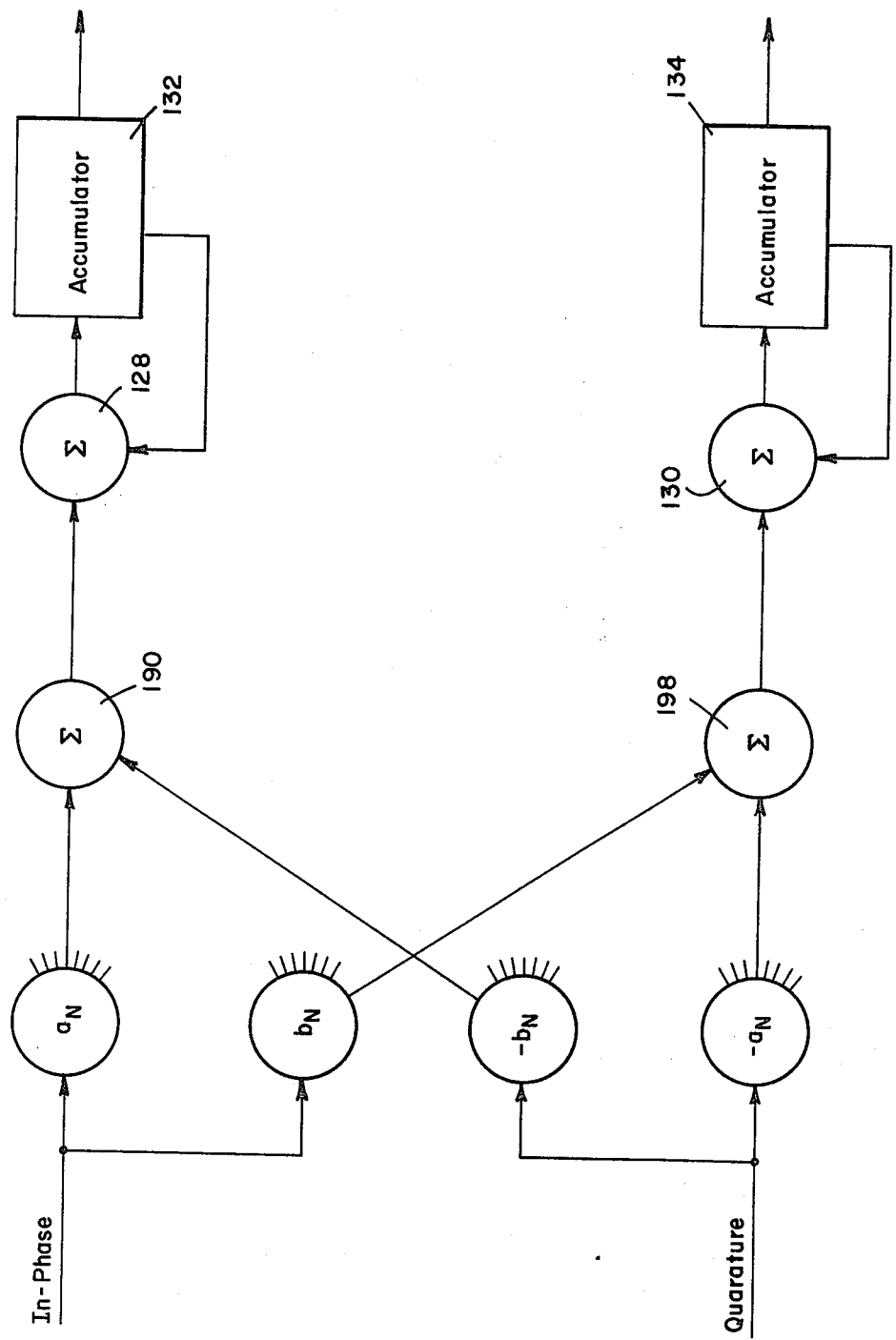

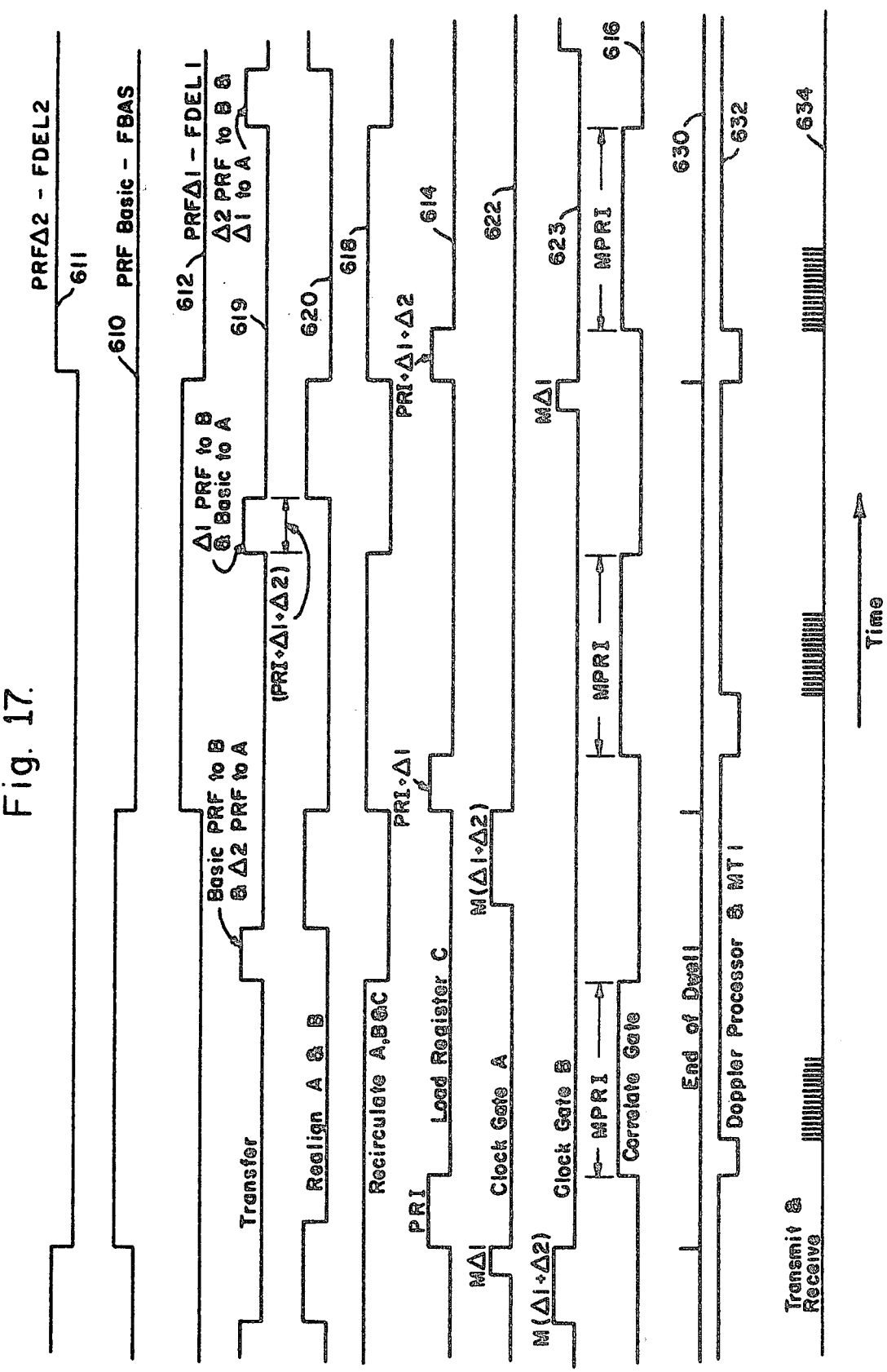

RANGE RESOLVING DOPPLER RADAR SYSTEM

The invention herein described was made in the course of or under a Contract or Subcontract thereunder with the U.S. Government.

BACKGROUND OF THE INVENTION

1. Field of the Invention

This invention relates to a mechanization for resolving ambiguous range and particularly to an ambiguous range resolving system operable in a digital doppler radar system for measuring range of targets at relatively high velocities.

2. Description of the Prior Art

For radar systems operating at medium or high PRF (pulse repetition frequency), target range at ranges greater than the equivalent distance between transmitted pulses are ambiguous and provide an indefinite range reading. Conventionally, systems are provided to perform a range only coincidence to remove the ambiguous results but these conventional arrangements are limited to targets at relatively low velocity such as under 800 knots. These conventional systems which only respond to the filter numbers in one or the near range bin for detecting a target, result in detection of a large number of false targets. A system that would unscramble ambiguous range with a minimum of false target detections when the relative velocity of the targets is substantially high, would be an improvement and an advantage to the art.

SUMMARY OF THE INVENTION

The seventeen path filter correlator in accordance with the invention compares the doppler filter numbers arranged in a pulse repetition frequency (PRF) sequence according to the valid paths provided by three adjacent range bins. The path selection in range is initially determined at the output of three dwell storage registers recirculating different PRF data therein for providing conditions of alignment of the ambiguous target range signals. In the correlation operation, the requirements are to derive all the target comparisons that occur according to range versus azimuth or PRF paths and to correlate each comparison that occurs according to filter number. A signal-to-noise selection unit is provided prior to the correlator to insure that the filters passing the target signals has the largest signal-to-noise ratio when simultaneous detections from more than one filter occur in the same range bin. In order to account for the same target velocity causing outputs in adjacent doppler filters because of the PRF jitter, the velocity or filter numbers are compared in the correlator to be within one of each other across seventeen paths provided by the three dwell storages and three adjacent range bins. Because filter correlation must take place with the stored dwell data in a PRF sequential order, a multiplexing arrangement is provided between the dwell storage registers and the correlator to minimize the required equipment and data transfer logic. The correlator after satisfying the seventeen path correlation algorithm provides a verification that a target is present in the reference range bin and provides unambiguous range of that target.

It is therefore an object of this invention to provide an improved system for unambiguous measurement of target range.

It is a further object of this invention to provide a system for the measurement of ambiguous target range for targets at relatively high velocities.

It is a still further object of this invention to provide a target detecting system that provides a minimum number of false targets.

It is a still further object of this invention to provide a simplified and improved system for unscrambling ambiguous range and detecting targets with a substantially constant false alarm rate and with a minimum of false target correlations when the velocity of the targets can be substantially high.

It is another object of this invention to provide simplified and improved digital mechanization for resolving unambiguous range for medium PRF digital doppler radar systems.

BRIEF DESCRIPTION OF THE DRAWINGS

These and other objects, features and advantages of the invention itself will become apparent to those skilled in the art in the light of the following detailed description, taken in consideration with the accompanying drawings, wherein like reference numerals indicate like or corresponding parts throughout the several parts wherein:

FIG. 6 is a schematic diagram for explaining the coefficients that may be utilized to provide the phase shift in 8 doppler filters in accordance with the invention;

FIG. 9b is a schematic block and circuit diagram of the clock control source for realigning the data in the registers of FIG. 9a;

FIG. 17 is a schematic diagram of voltage as a function of time for further explaining the operation of the system of FIG. 1.

DESCRIPTION OF THE PREFERRED EMBODIMENT

Figure 1:
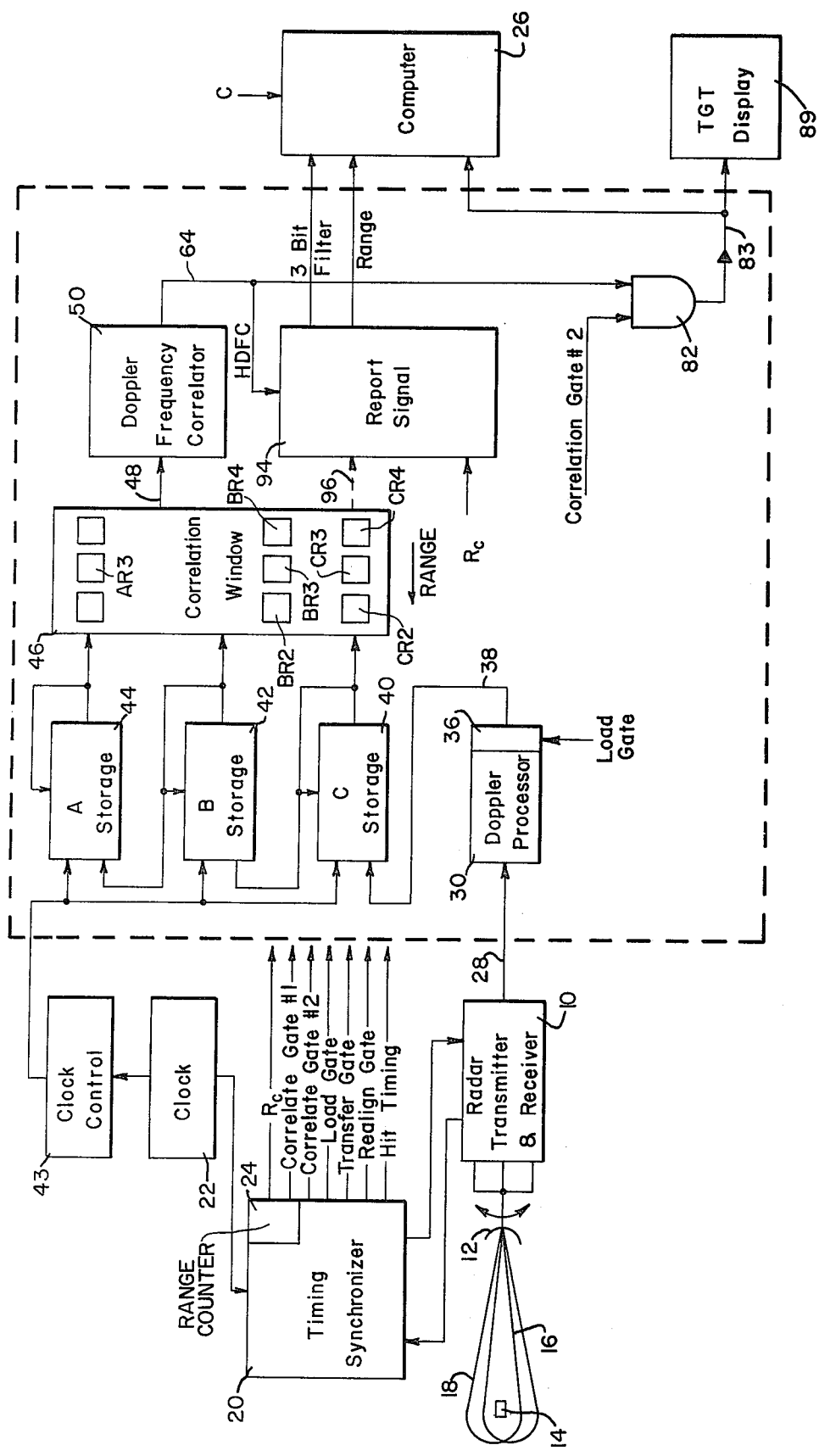
FIG. 1 is a schematic block diagram of the unambiguous target range and coordinate resolving system in accordance with the invention.

Referring first to FIG. 1, the range correlation radar system in accordance with the invention may operate in response to a radar transmitter and receiver 10 which may be a conventional doppler transmitter and receiver combination transmitting energy through a scanning antenna 12 into space toward a target 14 as a plurality of bursts of transmitted energy. Each burst or plurality of pulses may define a dwell period during which energy from adjacent lobes such as 16 and 18 illuminate the target 14 and reflect energy back to the antenna 12 and into the doppler receiver. Timing of the pulse transmission may be controlled by a timing synchronizer 20 responsive to a clock 22 and also providing timing pulses to a range counter 24 which is initiated by a transmission timing signal to develop range count, $R_c$, data which is utilized upon occurrence of each valid target signal. To receive data from each burst of pulses, a signal is applied from the receiver in the transmitter and receiver unit 10 through a composite lead 28 to a doppler processor 30 which may include a group of digital doppler frequency filters to provide real time digital filtering either, for example, with a fast fourier transform or by a Walsh transform, which techniques are well-known in the art. Any suitable digital doppler filter that provides accumulation of the data from a plurality of transmitted pulses over a plurality of range bins to provide a filter number for each range bin in which a target appears may be utilized. For example, doppler filters may be utilized of the type described in real time digital filtering, Vol. 1, *National Electronic Conference of Professional Growth*, entitled "Real Time Digital Filtering and Spectrum Analysis", copyright 1969 by the National Electronic Conference and dated June 1969. Walsh transforms are described in a book by Haning and Harmon and a digital filter is described in *Digital Processing of Signals* by Gold and Rader, published 1969 by McGraw-Hill. An illustrative doppler processor 30 is also explained relative to FIGS. 2 through 6 for further clarity. The doppler processor unit 30 may also include threshold detection circuits for only passing a filter number representing an unambiguous target when a selected threshold condition has been satisfied.

In response to a load gate 36, the doppler processor 30 which includes a memory for accumulating and storing returns from each range bin, serially applies data from the memory through a composite lead 38 to a C dwell storage unit 40.

Additional dwell storage units, B storage unit 42 and A storage unit 44, are also provided, all responsive to a clock control unit 43 in turn responsive to clock C input signals from the clock source 22. The dwell storage units 40, 42 and 44 are interconnected so that after the C storage unit 40 is loaded with data from the doppler filters representing the returns from one dwell or transmission burst of pulses, transfer of data to the other registers may be provided. The purpose of the storage is to accumulate three adjacent dwells of ambiguous range information, align them so that corresponding range bins from each dwell can be observed simultaneously and recirculate the information to resolve the ambiguous range. The dwell storage registers C, B and A are capable of holding all of the ambiguous data in three adjacent dwells on a range bin by range bin basis. Each set of registers is loaded and unloaded serially with respect to range and programmed by the timing unit 20 to properly adjust its bit length equal to either the basic PRF or the basic PRF with one of two associated jitter lengths. Three dwells of data must be initially loaded into the registers 40, 42 and 44 before a valid processing operation or period can begin. A load period, a correlation period, a transfer period, and a realignment period are required for processing during each dwell period. Pulse bursts of the jitter lengths designated basic, $\Delta 1$ (delta one) and $\Delta 2$ (delta 2), are each transmitted into space for one dwell period with the three jitter lengths being sequenced at the beginning of each new dwell period on a modulo 3 basis. After the three dwells storage registers have been loaded with a PRF or a PRF+ jitter signal, the unfolding process begins and the data is recirculated within its own register at its particular length as adjusted for the number of bits or range bins at that PRF. The principles of the invention are applicable to different radar frequencies if desired for different correlation determinations. As the range bins of data are recirculated in the storage registers, the filter number data from corresponding range bins in each of the 3 dwell storage registers, as well as amplitude data, is serially, by range bin, loaded into a 3-range bin storage or correlation window 46 formed by three flip-flops coupled to the last three flip-flops of the corresponding registers. The window may be 3 flip-flops deep for a 3-bit filter number. The flip-flop window units, each three flip-flops deep, are labeled as AR3, as BR2, BR3, and BR4 and as CR2, CR3, and CR4, for serially receiving data from the respective A, B & C storage units. In some arrangements in accordance with the invention, the last three flip-flops containing the filter number data may form the moving window. If additional data for each range bin is to be transferred as a result of the correlation, this data remains in the dwell registers 40, 42 and 44 until a valid target correlation is completed. Thus, only the filter number data at the various range bins is required to be correlated to perform a target determination without transferring all of the data that may be associated with a target. The correlation window 46 allows correlation to be attempted over 3 contiguous range bins of data, the three range bins changing to greater ranges as the data is shifted through the dwell storage units 40, 42 and 44. Recirculation paths are shown from the storage units 40, 42 and 44 to illustrate that all of the data is recirculated. When data is to be transferred to a composite lead 96 and in turn through a report signal gate 94 when a valid target condition has been detected, data paths are provided between the units 40, 42 and 44 and the composite lead 96. The filter numbers are applied through a composite lead 48 to a doppler frequency correlator 50 which provides 17 paths of correlation for detecting the presence of a valid unambiguous target and determining the unambiguous range of that target. The target signal on the lead 64 is applied through an AND gate 82, a lead 83 and to both the computer 26 and to a target display unit 89 for indicating the occurrence of a valid target. The AND gate 82 also receives a correlated gate No. 2 signal from the synchronizer 20 which prevents an output signal passing therethrough during the first and second initial dwell periods during startup of the radar operation and during load, transfer, and realignment. It is to be noted that in the computer 26 or elsewhere in the system, further processing, in addition to the 17 path correlation, may be performed to provide elevation beam-splitting, azimuth beam-splitting, and determination of the centroid of target in range, such as by transferring the data from all of the range bins of the range-dwell correlation profile to the computer.

The target display unit 89 is responsive to the valid target signal on a lead 83 and is suitably synchronized on a range bin by range bin basis. The report signal gate unit 94 responds to a valid target signal HDFC from the correlator 50 to pass the range data $R_c$ to the computer 26. The correlator responds to three adjacent range bins with the center range bin being the reference range bin that controls the gate 94 to pass range data from that range bin. If additional data is to be transferred, it is gated through the composite lead 96 (shown dotted) to the computer 26. In some systems, data accompanying a target determination may be a 3-bit filter number, an 8-bit elevation value, a 20-bit range number, an 8-bit S/N (signal-to-noise) ratio, and an 8-bit noise level number, all of which may be transferred as a result of a 17 path correlation in accordance with the invention and other desired criteria.

Figure 2:
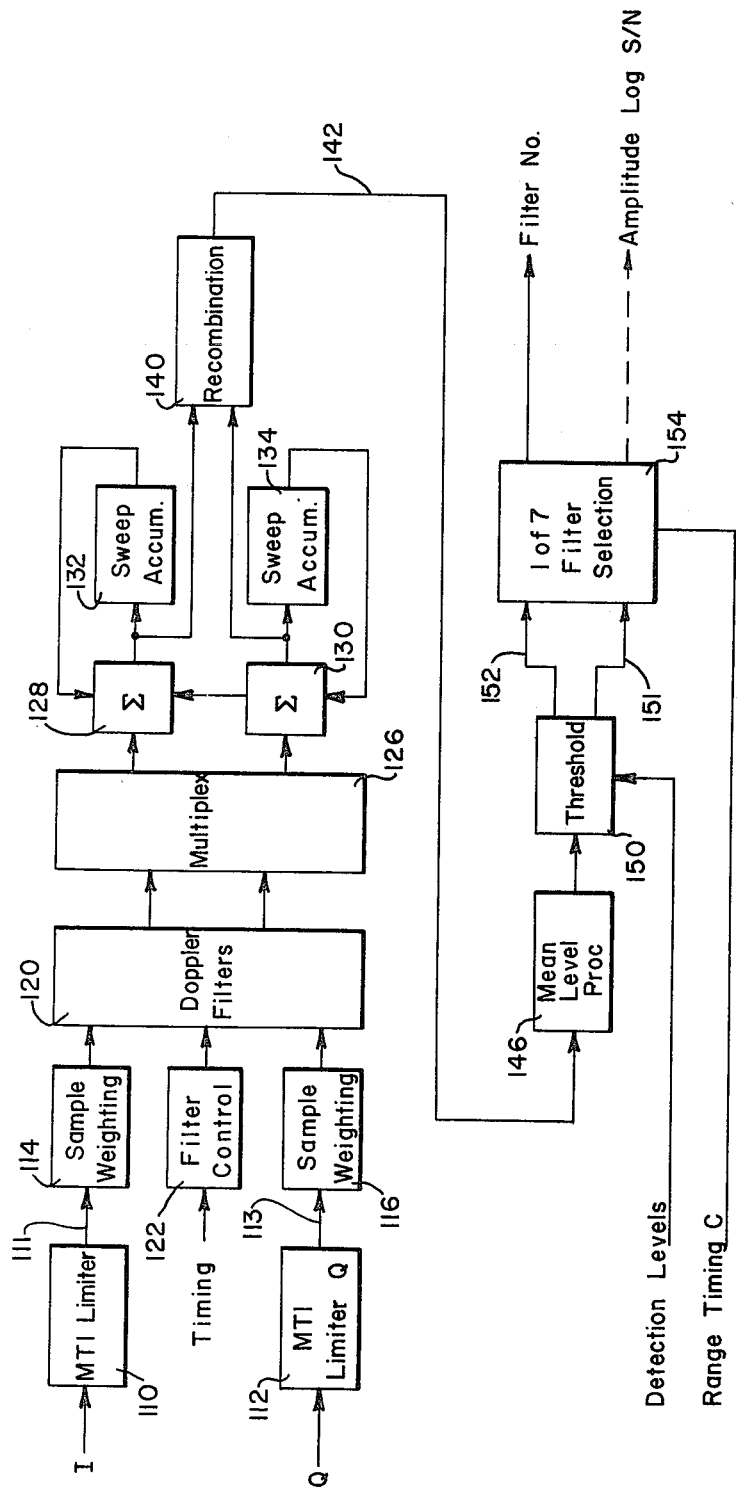
FIG. 2 is a schematic block diagram of the doppler processor utilized in the system of FIG. 1.

Referring now also to FIG. 2, which shows an illustrative example of the doppler processor 30 responsive to in-phase I data and quadrature Q data at video frequency which is received in digital form from the receiver on composite lead 28 and is respectively applied to MTI limiters 110 and 112. The MTI units may be any suitable type of moving target indicators having one or two, or as many as required, memory and cancellation units therein. The MTI limited data is applied from the units 110 and 112 respectively through composite leads 111 and 113 and sample weighting units 114 and 116 to a doppler filter bank 120 which may develop any suitable number of filters such as 7 or 8 in response to suitable timing provided by filter control unit 122 which is in turn being responsive to timing signals from the synchronizer 20. The incoming data is time sample weighted by one of two available weighting functions, for example, in the weighting units 114 and 116. The filters of the unit 120 rotate the weighted MTI samples as a function of transmission number and filter center frequency and then accumulates a result from each transmission burst for each range bin. After the final transmission in a radar dwell has been processed, the resultant samples are amplitude detected using the standard I + KQ algorithm. The multiplexing unit 126 responds to the filter bank 120 to apply signals to summing units 128 and 130 and in turn to respective sweep memory or accumulating units 132 and 134 which feed back their output to the summing units 128 and 130. The signals out of the summing units 128 and 130 for seven filters in the illustration of FIG. 2 are then applied to the recombination unit 140 to apply the combined I and Q signals for seven filters as binary numbers representing signal amplitude from a composite lead 142 to a mean level processing unit 146 and in turn to a threshold circuit 150 in which each signal in its range cell is compared with a threshold signal and if the threshold is exceeded, the target detection bit is generated. The threshold unit 150 and the mean level processor 146 convert the signal to a logarithm of signal over noise (log S/N) to establish the probability of false alarm (PFA) ratio. The signal is then applied through a composite lead 152 to a signal comparison circuit 154 in which a 1 out of 7 filter selection is provided and in which the filter with the largest signal-to-noise ratio is selected from the doppler filter output with that filter number being utilized as a signal representative of the valid target if it passes the minimum threshold. A composite lead 151 applies a plurality of detection signals to the unit 154 indicating that a signal in a corresponding filter has met a threshold level criteria. The filter selection unit 154 then applies filter number data representative of the selected target to the gate unit 36. Also additional data may be transferred through the switch 36 and may include any desired characteristic such as amplitude or logarithm S/N, or other data such as beam-split information and quadrature signs.

Figure 3:
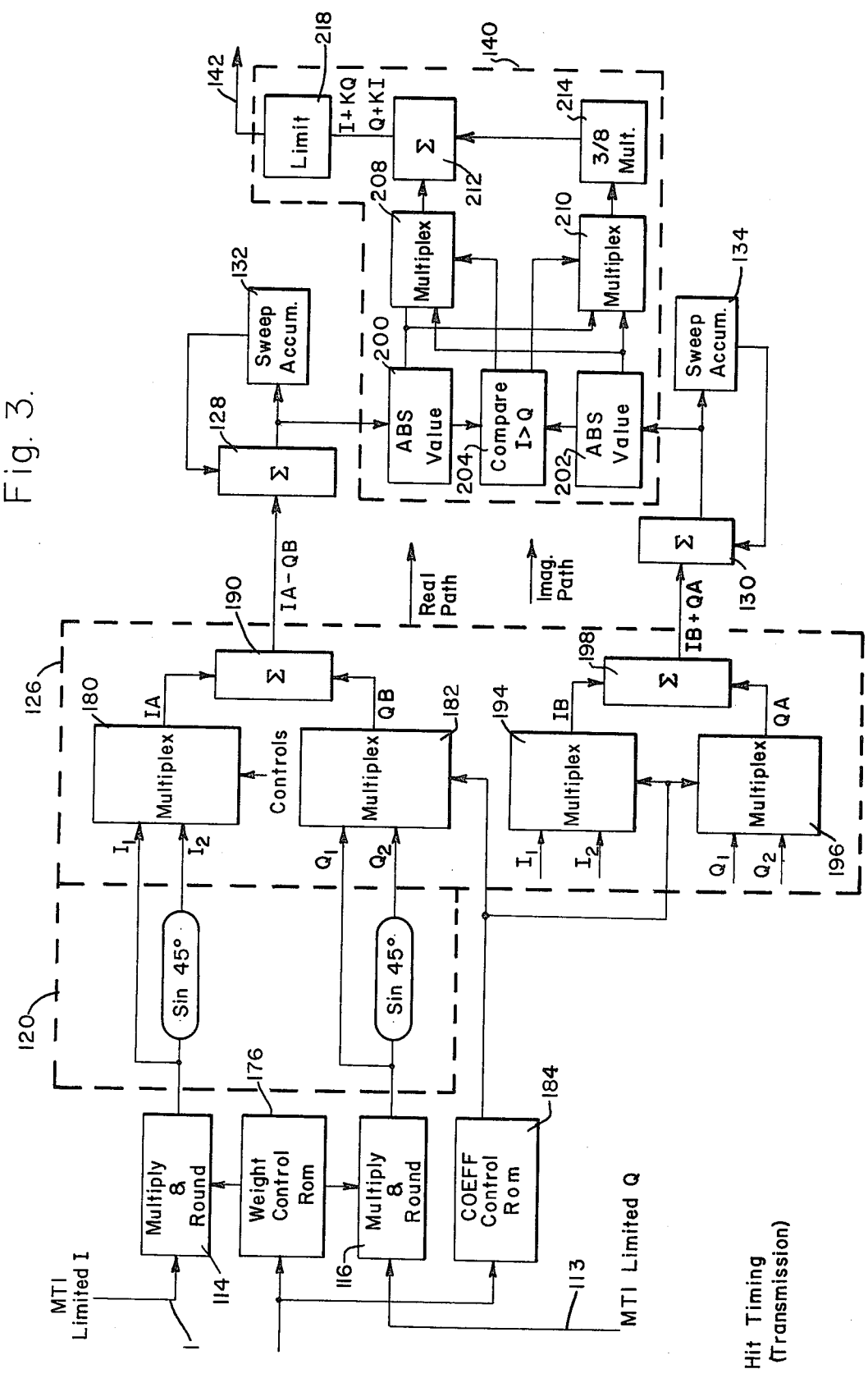
FIG. 3 is a schematic block diagram of a typical doppler filter that may be utilized in the doppler processor of FIG. 1.

Referring now also to FIG. 3, one of the doppler filters of the unit 120 and the multiplexer 126, the summers 128 and 130 and the I and Q recombination unit 140 for the doppler filter will be explained in further detail. The MTI limited I and Q signals are applied to respective weighting or multiply and round units 114 and 116 in which the signals are simultaneously multiplied by suitable coefficients as a function of the hit number or transmission number so that uniform weighting applies substantially the same gain to return signals from successive radar transmissions and the filters exhibit a desirable frequency response. This type of time weighting reduces the frequency sidelobe levels as is well-known in the art, and may be controlled by a read only memory (ROM) control unit 176 as an example of the filter control 122 and in which the weighting coefficients are derived in response to a timing or transmission address signal. The weighting coefficients are applied to the multiplying units 114 and 116, which may be conventional digital full adders and may provide suitable roundoff limitations to the digital product such as limiting of the number of bits in the product. The hit timing signals are applied to the memory unit 176 so that for each of the pulses of each dwell, appropriate weighting is applied to the return signals to allow the filters in each range bin to exhibit a (sin X/X) frequency response characteristic. It is to be noted that in some arrangements, complex phase and amplitude weighting may be utilized in addition to the above-described weighting.

The weighted signals in the I and the Q channels are then applied in parallel through direct connected leads and through multipliers in the unit 120 (indicated as Sin 45° for a 45° doppler filter) to corresponding multiplex units 180 and 182 which gate the signals as a function of the transmission or hit number as provided by a coefficient control read only memory 122 responsive to the hit timing signals. The filtering is provided in unit 120 by each I and Q sample being multiplied by two coefficients selected from ±1, ±0.707 and ±0 and with the products being accumulated for a plurality of sweeps. The multiplexers gate the different products of the signals and the coefficients as required for each hit number to the output leads. The multiplying coefficients are generally represented as A and B. Although FIG. 3 only represents one of seven filters as provided in the illustrated system, it is to be understood that additional filters with desired combinations of multipliers are used for additional doppler filters each with accumulators such as sweep accumulators 132 and 134. The multiplied signals IA and QB are then applied to a summing unit 190 which develops a signal IA − QB which in turn is applied through the summing unit 128 and to the accumulator or memory 132. A feedback path is provided from the accumulator 132 to the summer 128 to allow accumulation of all of the pulse returns of a dwell period for each range bin interval.

In a similar arrangement to that providing the input signals to the multiplexing units 180 and 182, multiplexing units 194 and 196 are provided responding to the correspondingly similar I and Q inputs and the selected multipliers to provide respective signals IB and QA which are applied to a summing unit 198 to develop the signals IB + QA which are applied to the summer 130. The accumulator 134 feeds back signals on a range bin basis to the summing unit 130 which along with the signal from the summing unit 128 is applied to the recombination unit 140. Amplitude detection $\sqrt{I^2 + Q^2}$ is approximated by absolute value I + ⅜ absolute value of Q if the absolute value I is greater than or equal than the absolute value of Q or the absolute value of Q + ⅜ if the absolute value of I is otherwise. This may provide a processing loss of approximately 1db (decibel). The absolute amplitude value is provided by units 200 and 202 which apply a signal to the comparison circuit 204 which determines when I is greater than Q and applies a gating signal to multiplexing circuits 208 and 210 to gate either I or Q to a summer 212 with the other signal going to a ⅜th multiplying unit 214. Thus either the I or Q signal is applied directly through the multiplexing unit 208 depending on the comparison of the compare circuit 204 and I + KQ or Q + KI is formed where K = ⅜. The output of the summer 212 which is I + KQ or Q + KI is then applied through a limiting circuit 218 to the composite output lead 142.

Figure 4:
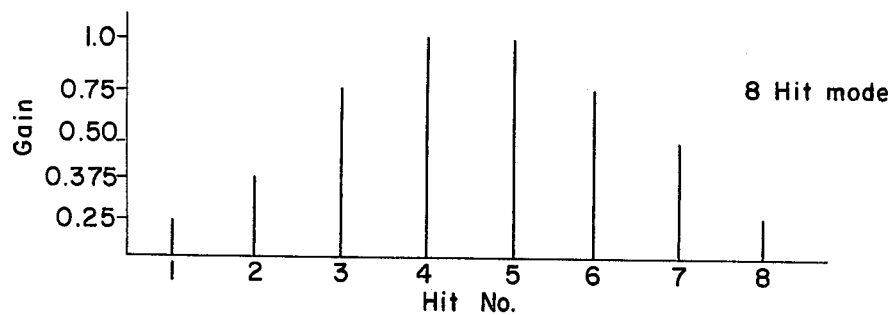
FIG. 4 is a schematic graph of gain versus hit number of 8 pulses resulting from the moving target indicator for explaining the weighting operations of the filter.
Figure 5A:
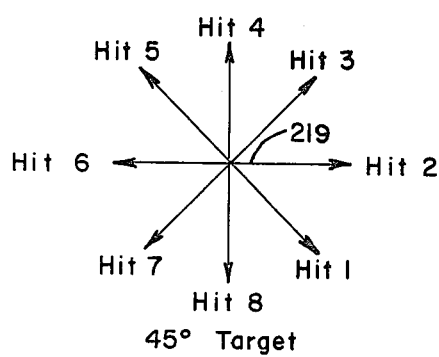
FIGS. 5a to 5d are vector diagrams for further explaining the operation of the doppler filters that may supply data in the system of the invention.
Figure 5C:
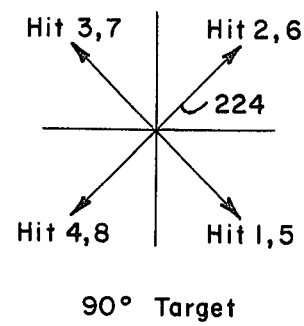
Figure 5B:
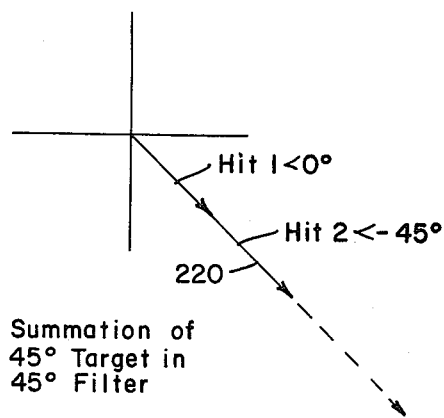
Figure 5D:
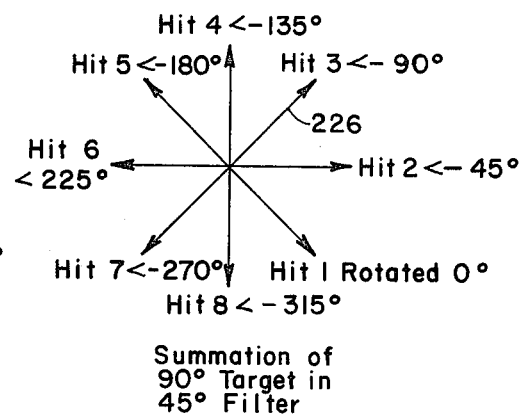

Referring now also to FIG. 4 which shows the amplitude of 8 returns from 8 successive radar transmissions in which the filters provide a (Sin X/X) frequency response. The multiplication coefficients provide a desired amplitude weighting such as a Haning weighting in the units 114 and 116. In this 8 hit mode the amplitude multiplication coefficients may be approximated by 0, ⅛, 2/8, ⅜, 4/8, ⅝, 6/8, ⅞ and 8/8 with both I and Q being multiplied by the selected coefficient. The selection of the weighting coefficient is in response to the hit timing signal applied to the memory 176.

Referring now principally to FIGS. 5a, 5b, 5c and 5d, the operation of the doppler filter as is well-known in the art will be first explained by an illustrative example which for simplicity will be based on an 8 hit transmission burst mode. For purposes of the example, we will assume the target has a radial velocity such that the incremental phase shift in its return vector is +45° per transmission as shown by the vector diagram 219. The process which supplies a compensating −45° incremental shift for the return signals from each transmission of a dwell period will cause all the vector to have the same absolute phase and when these vectors are summed they will have a large resultant as shown by line 220 at the illustrated position of hit one. The filter equation is:

$$In + jQn = \sum_{m=1}^{K} (Im + jQm)(Amn + jBmn)(Weight_{mn})$$

↑ Filter output    ↑ MTI input where:

n = filter number     1 to 7 for 8 hit mode
                                  2 to 14 for 16 hit mode
K = number of hits    8 or 16 illustrating that the system is operable with selected number of pulses
m = hit number        for each dwell period
Amn = Cos θ
Bmn = Sin θ
θ = −(m−1)n2π/K radians The coefficients (|Amn|, |Bmn|) are approximated as 0, ⅛, 2/8, ⅜, 4/8, ⅝, 6/8, ⅞, 8/8. Both Im and Qm are simultaneously multiplied by all these coefficients and each filter then chooses the one corresponding to its filter equation. In the illustrated system, only 7 of the 8 possible filters are implemented as filter No. 8 or zero is in the clutter notch. At the same time, if a target has velocity such that its incremental phase shift and its return vector is +90°, for example, as shown by a vector diagram 224 the summation of the 90° target in the 45° filter equals zero because of the phase shift illustrated by the vector diagram 226. It can be seen that only the 45° target is summed or has a resultant vector of substantial amplitude in the 45° filter of the doppler filter bank. The operation is similar for each of the seven doppler filters, each having a different frequency band.

Referring now to FIG. 6 which is an illustrative diagram of the filter 120 and the multiplex unit 126 of FIG. 2 showing the multipliers $a_n$, $-a_n$, $b_n$ and $-b_n$ which, after multiplication by the signals, provide scalar quantities that are controlled in the summers 190 and 198 for each sample number or hit number. The following table shows for the $i^{th}$ filter for n samples the required phase rotation applied to the I and Q components with an angular spacing or phase shift between filters ρ of 45°, a bandwidth of 250 HZ and a PRF of 2000 HZ. In the table, 180° is indicated as 0.

| ith FILTER | niρ | ANGLE/SAMPLE n | | | | | | | |
|---|---|---|---|---|---|---|---|---|---|
| | | 0 | 1 | 2 | 3 | 4 | 5 | 6 | 7 |
| 0 | 0 | 0 | 0 | 0 | 0 | 0 | 0 | 0 | 0 |
| 1 | nρ | 0 | −ρ | −2ρ | −3ρ | 0 | 3ρ | 2ρ | ρ |
| 2 | 2nρ | 0 | −2ρ | 0 | 2ρ | 0 | −2ρ | 0 | 2ρ |
| 3 | 3nρ | 0 | −3ρ | 2ρ | −ρ | 0 | ρ | −2ρ | 3ρ |
| 4 | 4nρ | 0 | 0 | 0 | 0 | 0 | 0 | 0 | 0 |
| 5 | 5nρ | 0 | 3ρ | −2ρ | ρ | 0 | −ρ | 2ρ | −3ρ |
| 6 | 6nρ | 0 | 2ρ | 0 | −2ρ | 0 | 2ρ | 0 | −2ρ |
| 7 | 7nρ | 0 | ρ | 2ρ | 3ρ | 0 | −3ρ | −2ρ | −ρ |

The following two tables show the $a_n$ and $b_n$ multiplying coefficients utilized in the multiplying units of FIG. 6 to provide the filters of the above-described table. In the Figures, the n refers to the sample or hit number that defines the multiplier coefficient that is multiplied with the I or Q signal. The different products of a signal for each sample are multiplexed into the summers 190 and 198 by the multiplex unit 180 and 182 as shown in FIG. 3. Each multiplier coefficient unit of FIG. 6 provides 8 products indicated by 8 output leads that are then multiplexed to the summer 190 or 198 as a function of hit number. The A and B coefficients respectively representing the $a_n$ and $b_n$ coefficients are interchanged from the multiplex units 180 and 182 to the multiplex units 194 and 196.

| FILTER | $a_n$ COEFFICIENTS SAMPLE | | | | | | | |
|---|---|---|---|---|---|---|---|---|
| | n=0 | n=1 | n=2 | n=3 | n=4 | n=5 | n=6 | n=7 |
| 0 | 1.000 | 1.000 | 1.000 | 1.000 | 1.000 | 1.000 | 1.000 | 1.000 |
| 1 | 1.000 | 0.707 | 0.000 | −0.707 | −1.000 | −0.707 | 0.000 | 0.707 |
| 2 | 1.000 | 0.000 | −1.000 | 0.000 | 1.000 | 0.000 | −1.000 | 0.000 |
| 3 | 1.000 | −0.707 | 0.000 | 0.707 | −1.000 | 0.707 | 0.000 | −0.707 |
| 4 | 1.000 | −1.000 | 1.000 | −1.000 | 1.000 | −1.000 | 1.000 | −1.000 |
| 5 | 1.000 | −0.707 | 0.000 | 0.707 | −1.000 | 0.707 | 0.000 | −0.707 |
| 6 | 1.000 | 0.000 | −1.000 | 0.000 | 1.000 | 0.000 | −1.000 | 0.000 |
| 7 | 1.000 | 0.707 | 0.000 | −0.707 | −1.000 | −0.707 | 0.000 | 0.707 |

| FILTER | $b_n$ COEFFICIENTS SAMPLE | | | | | | | |
|---|---|---|---|---|---|---|---|---|
| | n=0 | n=1 | n=2 | n=3 | n=4 | n=5 | n=6 | n=7 |
| 0 | 0.000 | 0.000 | 0.000 | 0.000 | 0.000 | 0.000 | 0.000 | 0.000 |
| 1 | 0.000 | −0.707 | −1.000 | −0.707 | 0.000 | 0.707 | 1.000 | 0.707 |
| 2 | 0.000 | −1.000 | 0.000 | 1.000 | 0.000 | −1.000 | 0.000 | 1.000 |
| 3 | 0.000 | −0.707 | 1.000 | −0.707 | 0.000 | 0.707 | −1.000 | 0.707 |
| 4 | 0.000 | 0.000 | 0.000 | 0.000 | 0.000 | 0.000 | 0.000 | 0.000 |
| 5 | 0.000 | 0.707 | −1.000 | 0.707 | 0.000 | −0.707 | 1.000 | −0.707 |
| 6 | 0.000 | 1.000 | 0.000 | −1.000 | 0.000 | 1.000 | 0.000 | −1.000 |
| 7 | 0.000 | 0.707 | 1.000 | 0.707 | 0.000 | −0.707 | −1.000 | −0.707 |

Figure 7:
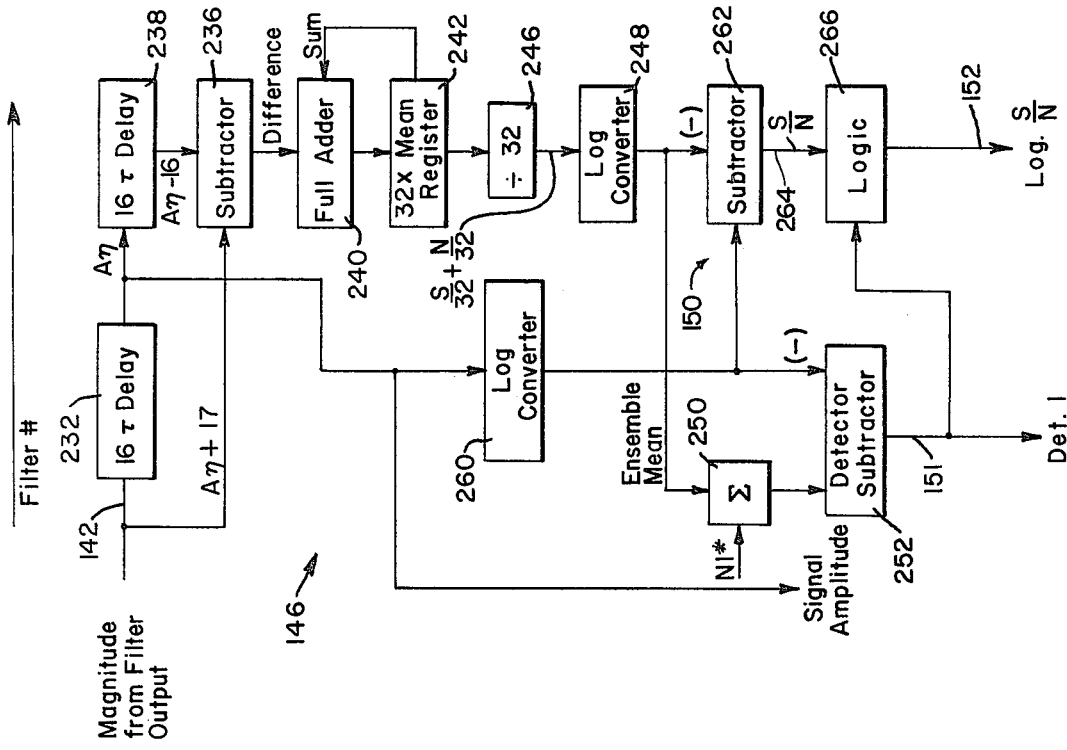
FIG. 7 is a schematic block diagram of the threshold generator and mean level detector utilized in the doppler filter system of the invention.

Referring now to the threshold generator and mean level detector circuit of FIG. 7 which is an illustrative example of the mean level processor 146 and the threshold circuit 150 of FIG. 2 for one of the seven filters. The combined magnitude digital signal is applied on the lead 142 to a delay circuit 232 which is a shift register of 16 flip-flops providing a moving window of the target data in each range bin or cell and having a delay of 16T where T represents a range cell. The magnitude signal on the lead 142 is also applied to a subtractor 236 which receives a signal $A_{n-16}$ from a delay or shift register circuit 238. The subtractor 236 provides a difference signal which is applied to a full adder 240 which in turn applies a sum to a 32 times mean register 242 which accumulates the signal amplitude containing 32 range cell and then applies the contents to a divider 246 which divides by 32 to generate the ensemble mean noise level for the 32 range cell sample which is S/32 + N/32. This signal is utilized to develop the detection threshold. The threshold setting for each filter is derived from the ensemble mean signal level of 32 sequential range cells with 16 of these cells preceding the cell of interest and 16 cells following. A signal from the divider 246 is applied through a log converter 248 which type is well-known in the art to provide a log base 2 or 10 format or any desired base and is applied to a summing circuit 250 receiving a gain factor N1* from a suitable source and in turn to a detector subtractor 252. The gain factor N1* is a fixed threshold value from a source such as a computer and which may be varied in some arrangement to maintain system constant false alarm rate. Each range cell is compared with a threshold signal and if the threshold is exceeded a target detection condition is generated which passes the filter number to the lead 151. The log noise amplitude provided by a log converter 260 is subtracted from the log signal amplitude in a subtractor 262 to generate the detected target signal-to-noise ratio on a lead 264. The signal provided by the subtractor 262 is applied to a logic or gating circuit 266 along with the detector signal from the lead 151 which passes the log S/N signal and the filter number to the filter selection network 154 for selecting the correct filter output having the largest S/N ratio.

Figure 8:
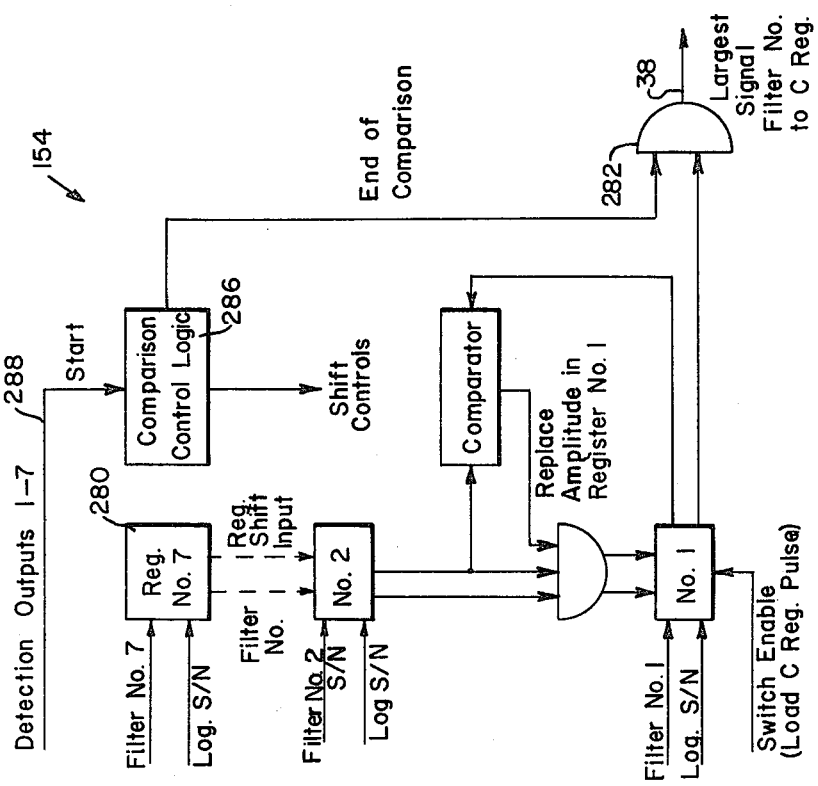
FIG. 8 is a schematic block diagram of the signal comparison system responsive to the filter output signals.

Referring now to FIG. 8 which illustrates the signal comparison circuit or selection circuit 154, the operation will be further explained for selecting the filter number having the largest signal-to-noise ratio at each range cell from the doppler filter outputs. By six comparisons of the signal to noise ratio, the filter number with the largest signal to noise ratio is determined. The filter output having the largest signal-to-noise ratio is selected when simultaneous detections from more than one filter occur within the same range bin. All seven filter outputs with their respective filter numbers are gated into seven shift registers 280 where the filter 1 output signal-to-noise amplitude is compared with that of filter 2, and the larger of the signal-to-noise ratio and corresponding filter number is retained in register 1. Filter 3 signal-to-noise ratio amplitude is then compared to the contents of register 1 and this process is continued through filters 7 with the largest of the 7 amplitudes plus the filter number being held in the output register, which is register number 1, and applied through an AND gate 282 at the end of the comparison operation as provided by timing logic unit 286 responding to the detection signals in any of the filter outputs on lead 288 such as on lead 151. In response to a detected filter number on composite lead 288, the control unit 286 which may operate at an increased rate from the clock signals controls the timing register timing until the end of the comparison. In some doppler processor systems simultaneous detection of a signal at selected levels within 6 contiguous ones of the 7 filters which may indicate broadband interference may be sensed by a logic unit (not shown) which applies an inhibit signal to the control logic unit 286 to prevent any detection report within that range cell from being applied through the AND gate 282. In the illustrated arrangement the filter number 0 which is a filter centered on the PRF line is not implemented in the comparator unit. The performance of this filter was found to be substantially effected by mainlobe clutter in the operating frequency provided by the notch of the MTI unit.

Figure 9A:
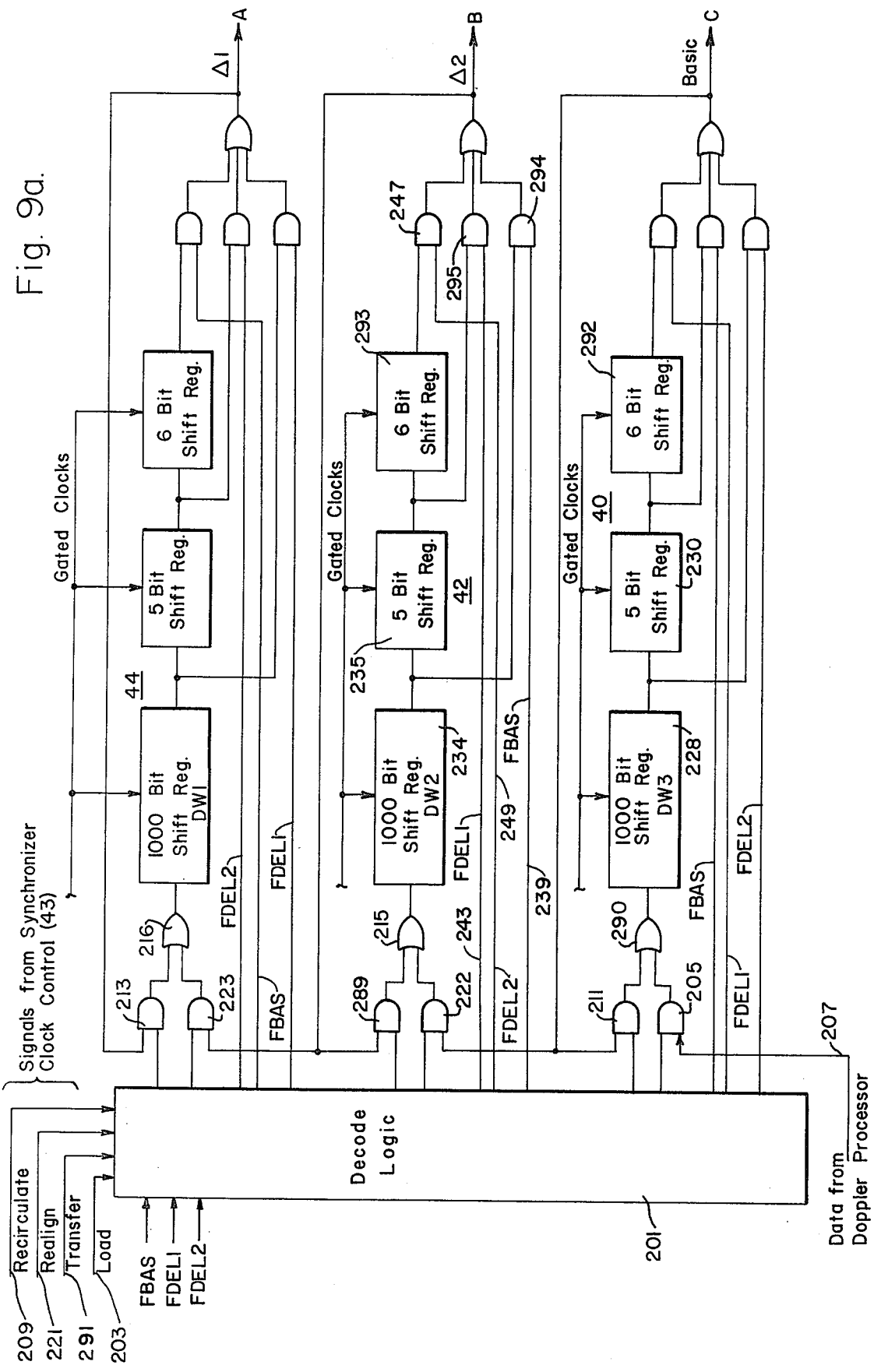
FIG. 9a is a schematic block and circuit diagram of the dwell storage unit of the system of FIG. 1.
Figure 9B:
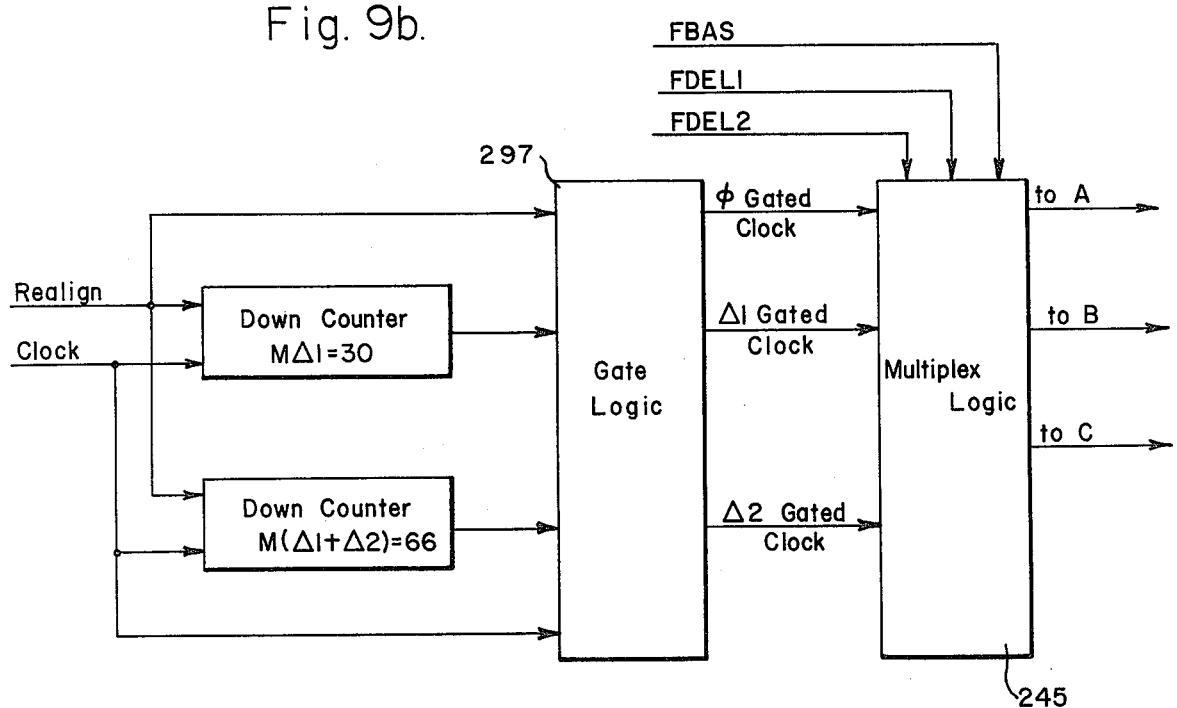

Referring now to FIGS. 9a and 9b which show a detailed mechanization of the dwell storage unit including storage units C or register 40, B or register 42 and A or register 44 controlled by a decode logic network 201 to apply Basic,, Δ1 and Δ2 signals to the correlate window unit 46 or other sequential combinations of these signals. FIG. 9b is a portion of the clock control unit 43. The purpose of the storage is to accummulate three adjacent dwells of ambiguous range information, align them so that corresponding range bins from each dwell can be observed simultaneously and recirculate the information to resolve the ambiguous range. Three dynamic registers have a sufficient length to hold all the ambiguous data in three adjacent dwells on a range bin by range bin basis as is determined by the range counter of the radar system. Each set of registers is loaded and unloaded serially with respect to range and programmed by the decode logic unit 201 responding to recirculate, realign, transfer and load signals. Also the unit 201 receives FBAS, FDEL 1 and FDEL 2 signals so that the length of each register is properly set during each dwell so that load, recirculate, transfer and realign are properly performed. The unit 201 includes a connecting structure in accordance with a subsequent table entitled CLOCKS so that for each gating interval the registers A, B and C have the length as shown in said table. The FBAS, FDEL1 and FDEL2 designations on the leads to the gates such as 247, 295 and 294 define the connections in unit 201 for setting the register lengths. The load signal energizes a gate 205, the recirculate signal energizes gates 211, 289 and 213, the transfer signal energizes gates 222 and 223, and the realign signal energizes gates 289 and 213, all provided by fixed gating or connecting structure in the unit 201. Three dwells of data must be loaded before a valid processing period can be initiated. A load period, a correlation period, a transfer period and a realignment period is required for each dwell Basic, Δ1 and Δ2. During each dwell period the proper shift register lengths are set in response to one of the FBAS, FDEL1 or FDEL2 signals. In response to a load signal on the lead 203 energizing a gate 205, loading is performed in the register C to short, medium or long to correspond to the transmitted PRI. In response to a recirculate pulse on lead 209 energizing one of the gates such as 247, 295 or 294 and gate 289, the data is recirculated in each of the registers. Transfers are then performed between registers C and B and B and A, with each register that receives data having its full length available for transferring the data therein. During the realignment period, all that is required is that a proper number of additional clock pulses be applied to one or both of the A and B registers. During loading, correlation and transfer, the proper number of clocks are applied to each register in response to PRF order signals FBAS, FDEL1 and FDEL2 and the loading recirculate and transfer timing pulses which provide gating in the clock control unit 43. The realign gating control is shown in FIG. 9b. During the load period the data from the most recent dwell is entered into the C register 40 in response to a load signal applied on the lead 203 to an AND gate 205 and to data applied to the AND gate 205 on a lead 207. The correlation period is provided in response to a recirculate pulse on a lead 209 energizing AND gates 211, 289 and 213, the recirculating signals passing through OR gates 290, 215 and 216. During the transfer period in response to a pulse applied to a lead 291, gates 222 and 223 are energized in combination with a recirculate pulse on a lead 209 to serially transfer the data in the register 40 to the register 42, from the register 42 to the register 44 and to effectively remove the original data in the register 44. The correlation time is equal to the number of basic recirculation periods and that is equal to the number of fill pulses transmitted in each dwell period such as 6. In the illustrated system, 6 range fill pulse, 2 MTI pulses and 8 doppler filter pulses are transmitted for each burst or dwell.

Each of the registers such as the register 40 is separated into a 1,000 bit shift register 228, a five-bit shift register 230 and a six-bit shift register 292 to provide a control for the length of the register depending on whether the data is at Basic or φ, Δ1 or Δ2 frequency. As a result of the recirculation for the illustrated storage condition, the Δ1 and Δ2 data in the respective register 42 and the register 44 is misaligned with respect to one another and with respect to range bin 1 of the register. This data is realigned so that range bin 1 of the data is placed in range bin 1 of the register by varying clock rates as determined by the clock control unit 43. For the basic length after recirculation in register 42, for example, an AND gate 294 is energized in response to a basic timing signal on a lead 239 so that the shift register 234 is the 1000 bit length of the DW2 storage register 42. For a basic +Δ1 length an AND gate 295 is energized in response to a basic +Δ1 pulse applied thereto on the lead 243 so that the register 42 has a length of recirculation equal to 1005 bits. When data is contained in the register 42 from a basic +Δ1+Δ2 PRF transmission and has a length such as 1011 bits, an AND gate 247 is energized in response to a PRF Δ2 signal on a lead 249. Thus depending upon the contents of each of the storage registers 40, 42 and 44 an appropriate AND gate is energized during the realignment interval. A realign signal on a lead 221 determines the realignment interval. By properly aligning all the range bins of data the correlations are properly performed so the data in all three sets of registers is serially shifted and recirculated on a range bin by range bin basis beginning with range bin 1 of each dwell period. The following table shows the data in the different registers during different transmit PRFs and the control of the clocks of FIG. 9b so that at the end of each recirculation, realignment is performed by stopping the clock to the register having the Basic data and applying different clocks to the register containing the Δ1 and Δ2 data. For the data stored in the illustrated positions, the C register containing the basic PRF data need not be aligned since there is no data in that register after the transfer period.

| Transmit PRFs | CLOCKS | | | PRF Order | Gating Pulse |
|---|---|---|---|---|---|
| | Short Reg-φ | Med. Reg. Δ1 | Long Reg. Δ2 | | |
| | 0 | MΔ1 | M(Δ1+Δ2) | | |
| Basic | | | | | |
| Δ1 | | | | | |
| Δ2 | C | A | B | 1 | F DEL 2 |
| Basic | B | C | A | 2 | F BAS |
| Δ1 | A | B | C | 3 | F DEL 1 |
| Δ2 | C | A | B | 1 | F DEL 2 |
| Basic | B | C | A | 2 | F BAS |
| Δ1 | A | B | C | 3 | F DEL 1 |

The above table is for operation with conventional static-type storage registers. If dynamic registers are utilized, the alignment may be performed by varying the clock rates to all three registers. It is to be noted that the above table shows the connecting logic to be used in the decode logic unit 201 of FIG. 9a. For alignment, if the register containing the Basic PRF is stopped at the end of the transfer period, which period is equal to the number of range bins or the length of the longest register, the number of clocks applied to each register is as follows:

| | |
|---|---|
| 0 | $\phi$ Register |
| $M(\Delta 1) = M\Delta 1$ | $\Delta 1$ Register |
| $M(\Delta 2 + \Delta 1) = M\Delta 1 + M\Delta 2$ | $\Delta 2$ Register | where
  M = the number of fill pulses utilized by the filters or 6 in the illustrative example.
  PRI = 1,000 intervals or range bins where a range bin interval is equal to 0.25 $\mu$ seconds in the illustrated example.

The total number of range bins = 1,000, 1,005 and 1011 for the three register lengths. Thus, for the $\phi$, $\Delta 1$ and $\Delta 2$ registers the number of clocks are respectively 0, 30 and 66 which define the additional clocks that must be added to the two registers containing the $\phi$, $\Delta 1$ and $\Delta 2$ data for alignment. Six recirculation intervals are provided to determine ambiguous range over the total range interval. Each fold during recirculation separates the alignment an amount equal to $\Delta 1$ or $\Delta 1 + \Delta 2$ which must be corrected during the alignment period. The gate logic unit 297 responds to the realign pulse and zero down counter signals to pass the basic gated clocks, the $\Delta 1$ gated clocks and the $\Delta 2$ gated clocks to a multiplexing unit 245 which as a function of the PRF order gates the clocks to the proper ones of three registers. The gating pulses provided by the PRF order as shown by the previous clock table control gates in the unit 245 to pass the additional clock pulses to the A, B and C registers in response to the FBAS, FDEL1 and FDEL2 gating signals.

Figure 10:
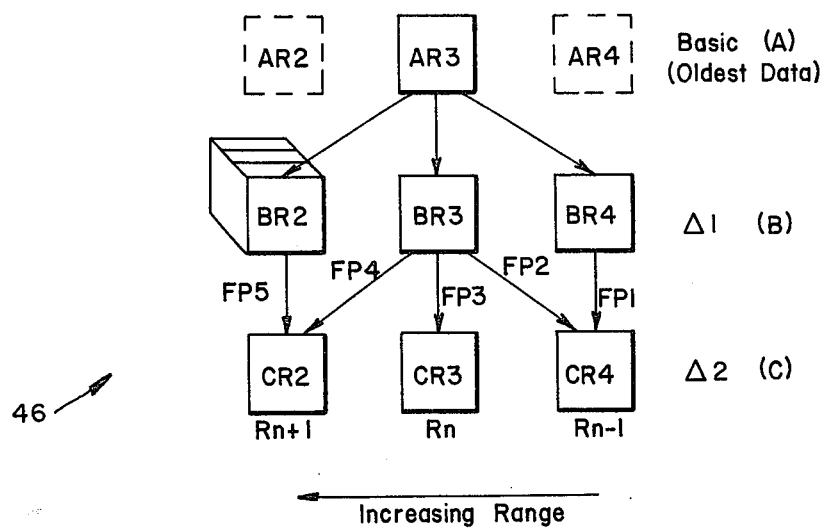
FIG. 10 is a schematic block diagram showing the dwell storage data as a function of increasing range for explaining the range azimuth profiles or paths utilized in the correlator of FIG. 1.
Figure 11:
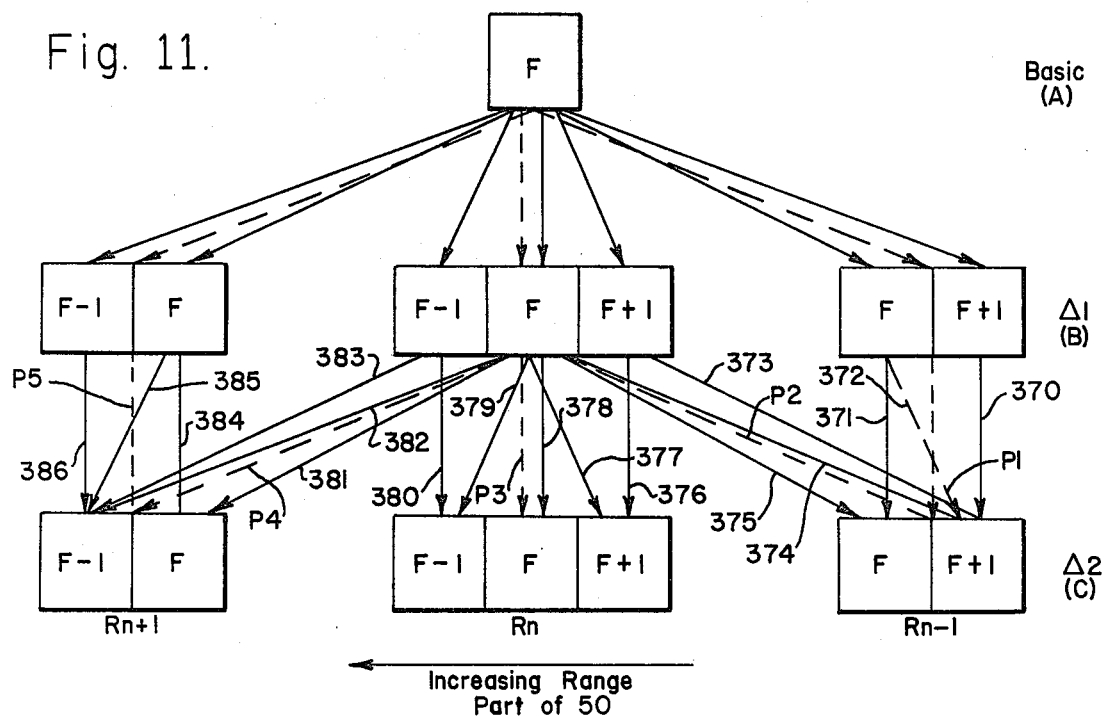
FIG. 11 is a schematic block diagram showing the dwell storage as a function of the range bins having the seventeen paths provided by adjacent filter numbers as resolved by the filter correlator of FIG. 1.

Referring now also to FIG. 10 as well as to FIG. 1, the range-azimuth profiles or paths of the correlation window 46 will be explained before explaining in further detail the operative components of the system of the invention. Portions of the Basic, $\Delta 1$ and $\Delta 2$ registers are shown for three range bins $R_{n+1}$, $R_n$ and $R_{n-1}$ with the Basic range bin $R_n$ being the reference cell as $R_n$ is the reference range bin being interrogated by the correlator. The correlator does not utilize the adjacent reference cells or range bins for the Basic or oldest data and these registers AR2 and AR4, are shown dotted. It is to be noted that by multiplexing the data from the three registers to the correlator 50 the PRF order of FIG. 10 is maintained. The registers of the range azimuth profile which may represent the correlation window unit 46 may have sufficient numbers of flip-flops to store the data for each range bin as shown at BR2, and contain the filter number, the elevation and any signal to noise information as desired. The range azimuth profiles or paths are shown as paths FP1 to FP5 and allow for a target that is either opening (increasing in range) or closing or static in range over the dwells of interest. Because of velocity limitations it has been determined that a target will not move over more than one range bin in three dwell periods. The filter data in the correlation window unit 46 is applied to the doppler frequency correlation unit 50 where the five paths are checked simultaneously relative to the reference range bin AR3 of Basic data to provide five signal outputs representing paths 1 through 5. In this filter correlation it is assumed that targets with the same filter number or velocity are from the same target or that the same filter number in the three range bins of a particular path is criteria for correlation. In FIG. 10 the A, B and C data are respectively Basic, $\Delta 1$ and $\Delta 2$ data because this path sequence is maintained for correlation by multiplexing the data from the three registers 40, 42 and 44 to the correct logical circuits. As can be seen in FIG. 11, paths P1 to P5 have corresponding seventeen filter number paths, paths 370, 371 and 372, paths 373, 374 and 375, paths 376, 377, 378, 379 and 380, paths 381, 382 and 383 and paths 384, 385 and 386. Each of the range azimuth paths FP1 to FP5 provides correlation in one of its filter correlation paths in accordance with the following logical equations:

FFP1 =
  (FBEA1·FCEA1)+FABC1[(FDEL2·FCGA1·$\overline{F}$·$\overline{BLA1}$)+(FBAS·FBEA1·FCLA1)+
  (FBAS·FBGA1·FCEA1)+(FDEL1·FBLA1·$\overline{FC}$·$\overline{GA1}$)] .

FFP2 =
  (FBEA3·FCEA1)+FABC2[(FDEL2·FCGA1·F·BLA3)+(FBAS·FBEA3·FCLA1)+
  (FBA5·FBGA3·FCEA1)+(FDEL1·FBLA3·$\overline{FC}$·$\overline{GA1}$)]

FFP3 =
  FABC3[FDEL2($\overline{FCEA3}$+FBEA3)+FDEL1(-FCEA3+$\overline{FBEA3}$) + FBAS($\overline{FBLA3}$+$\overline{FCLA3}$)($\overline{FBGA3}$+$\overline{FCGA3}$)]

FFP4 =
  (FBEA3·FCEA5)+FABC4[(FDEL2·F·CLA5·$\overline{FBGA3}$)+(FBAS·FCEA5·F·BLA3)+
  (FBAS·FBEA3·FCGA5)+(FDEL1·FBGA3·$\overline{F}$·$\overline{CLA5}$)]

FFP5 =
  (FBEA5·FCEA5)+FABC5[(FDEL2·F·CLA5·$\overline{FBGA5}$)+(FBAS·FCEA5·FBLA5)+
  (FBAS·BEA5·FCGA5)+(FDEL1·FBGA5·$\overline{F}$·$\overline{CLA5}$)]

FABC = (A $\geq$ B) (A $\geq$ C) + (A $\leq$ B) (A $\leq$ C)

The 17 filter number paths are the ones that are implemented in the correlator of the invention. Since the detection pattern is given latitude in both the range and doppler dimensions there are a multitude of possible logic combinations. Actually with three range cells, three filter numbers, and three dwells involved there exist 81 combinations or correlation paths possible. By restricting the range and filter dimensions to unilateral shifts these combinations are reduced to 25. By further restricting closing target patterns to specific filter shifts of one filter the paths are reduced to 17 hence the 17 path terminology. [e.g., closing targets are associated with increasing filter numbers; opening targets with decreasing filter numbers; and indeterminate targets, i.e., no range shift, are permitted for filter shifts in either direction. There are two closing paths which will correlate with the (F → F+1 → F+1), (F → F → F+1), and (F → F → F) filter paths for 6 combinations. There are also two opening paths which will correlate with the (F → F−1 → F−1), (F → F → F−1), and (F → F → F) filter paths for 6 more combinations. Finally there is one indeterminate path which will correlate with all five filter paths for a total of 17 paths.] If a valid path is detected this information is stored along with data relating to the particular path. Thus, FIG. 10 shows the five range paths FP1–FP5 and FIG. 11 shows the 17 filter paths. Because the multiplexing and correlation take place at the same time, the paths are determined by gating the filter number comparisons in the correlator so that a constant PRF order is maintained in the correlating function irregardless of the basic, Δ1 and Δ2 data in the A, B an C storage units.

Figure 12:
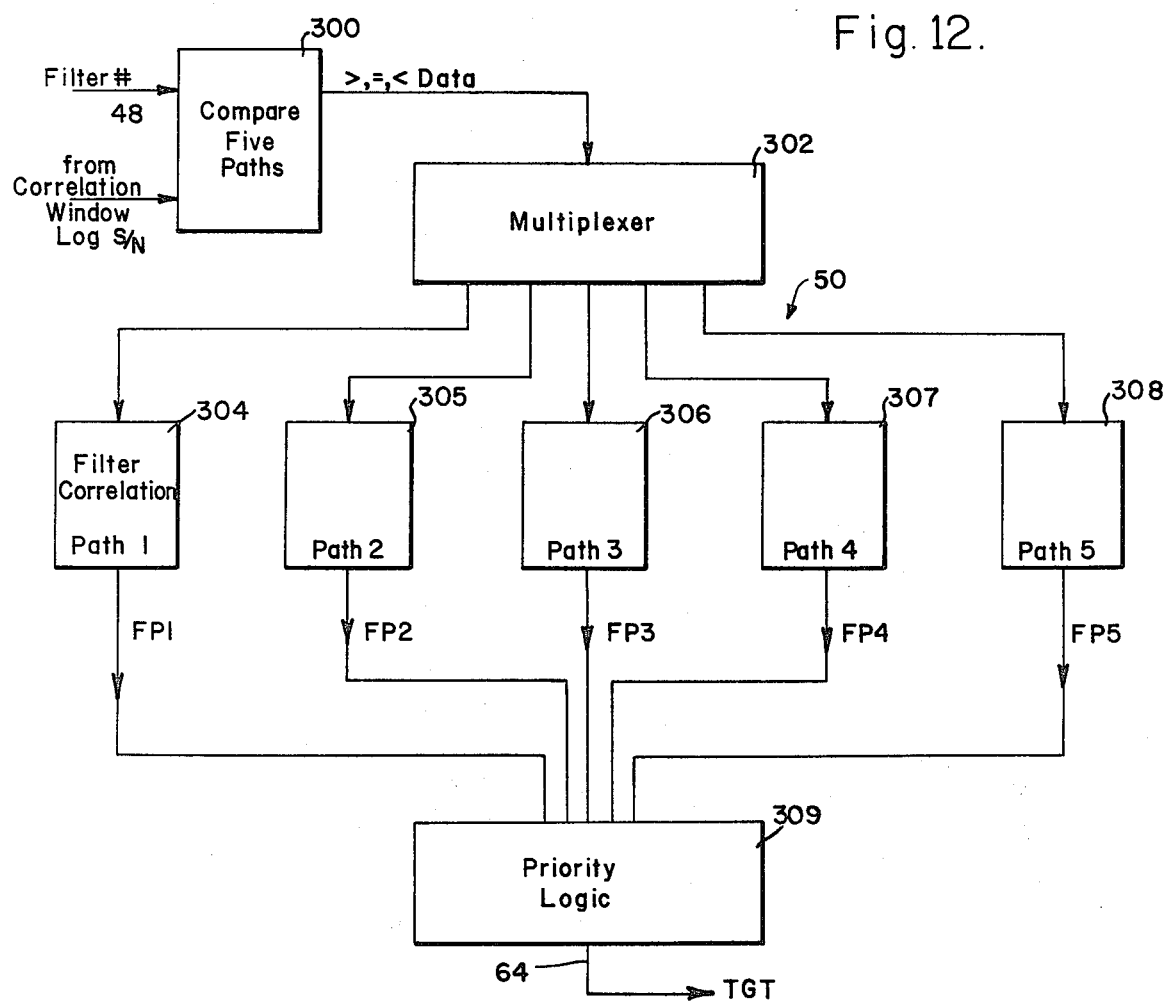
FIG. 12 is a schematic block diagram of the doppler frequency correlator of the system of FIG. 1.

For further explaining the doppler frequency correlator 50 the block diagram of FIG. 12 shows a 5-path comparator 300 generating greater than, equal or less than data which is applied to a multiplex unit 302 also responding to the PRF order timing from the synchronizer to apply the data to filter correlators 304 to 308 respectively representing paths 1 to 5. The multiplexer 302 is a gating unit that responds to the PRF order of the data stored in the C, B and A storage registers so that the correlation unit has always the same data from the proper PRF. The signals from the correlation units 304 to 308 are then applied through a priority logic unit 309, which includes a storage unit, and to the lead 64. The comparison of the five paths is provided by the correlation structure of FIGS. 13a and 13b including the comparators and multiplexing units, and the priority logic is provided by the priority unit of FIG. 13c.

Figure 13A:
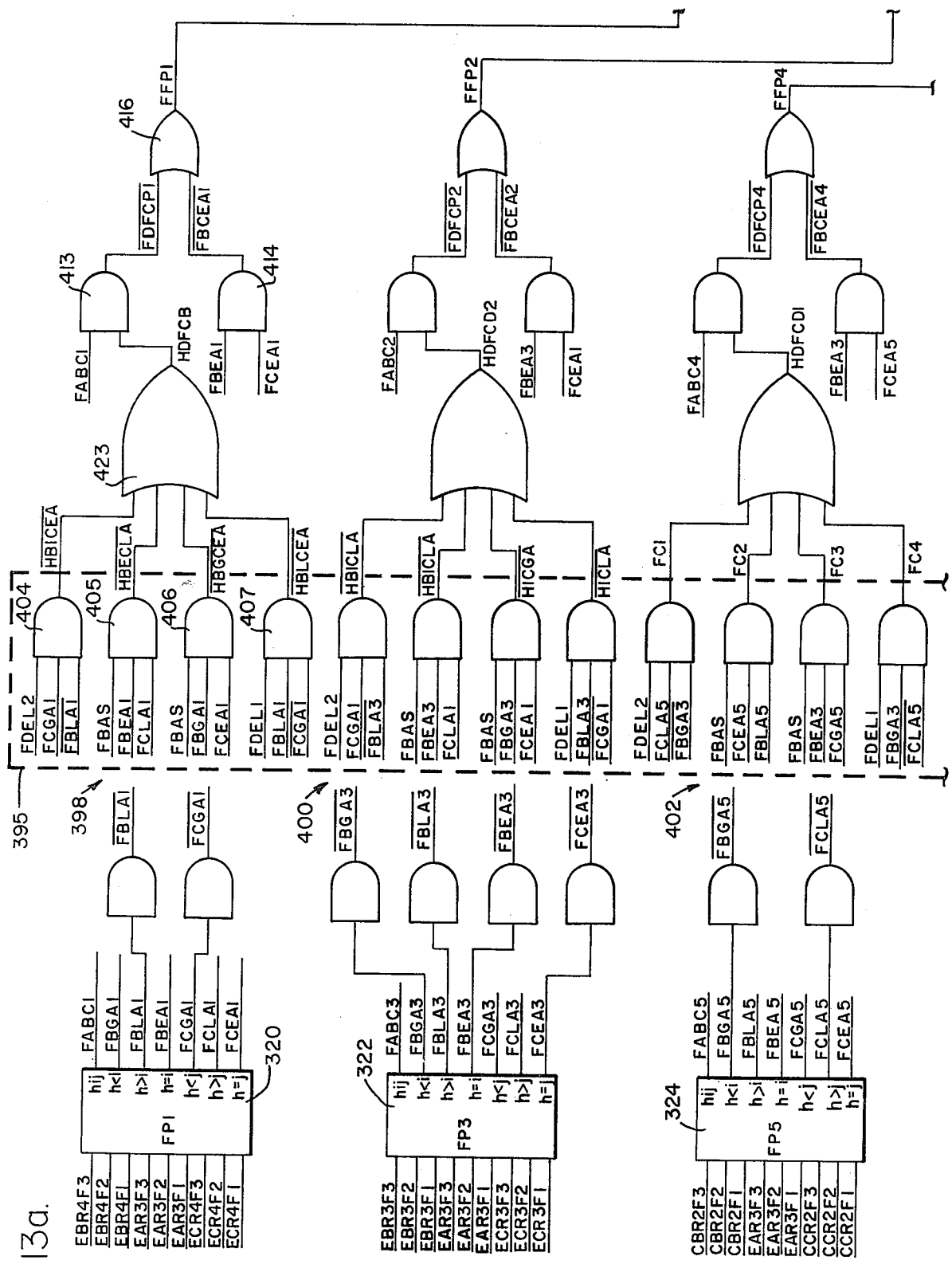
FIGS. 13a, 13b and 13c are schematic block and circuit diagrams showing further detail of the doppler frequency correlator of FIG. 12.
Figure 13B:
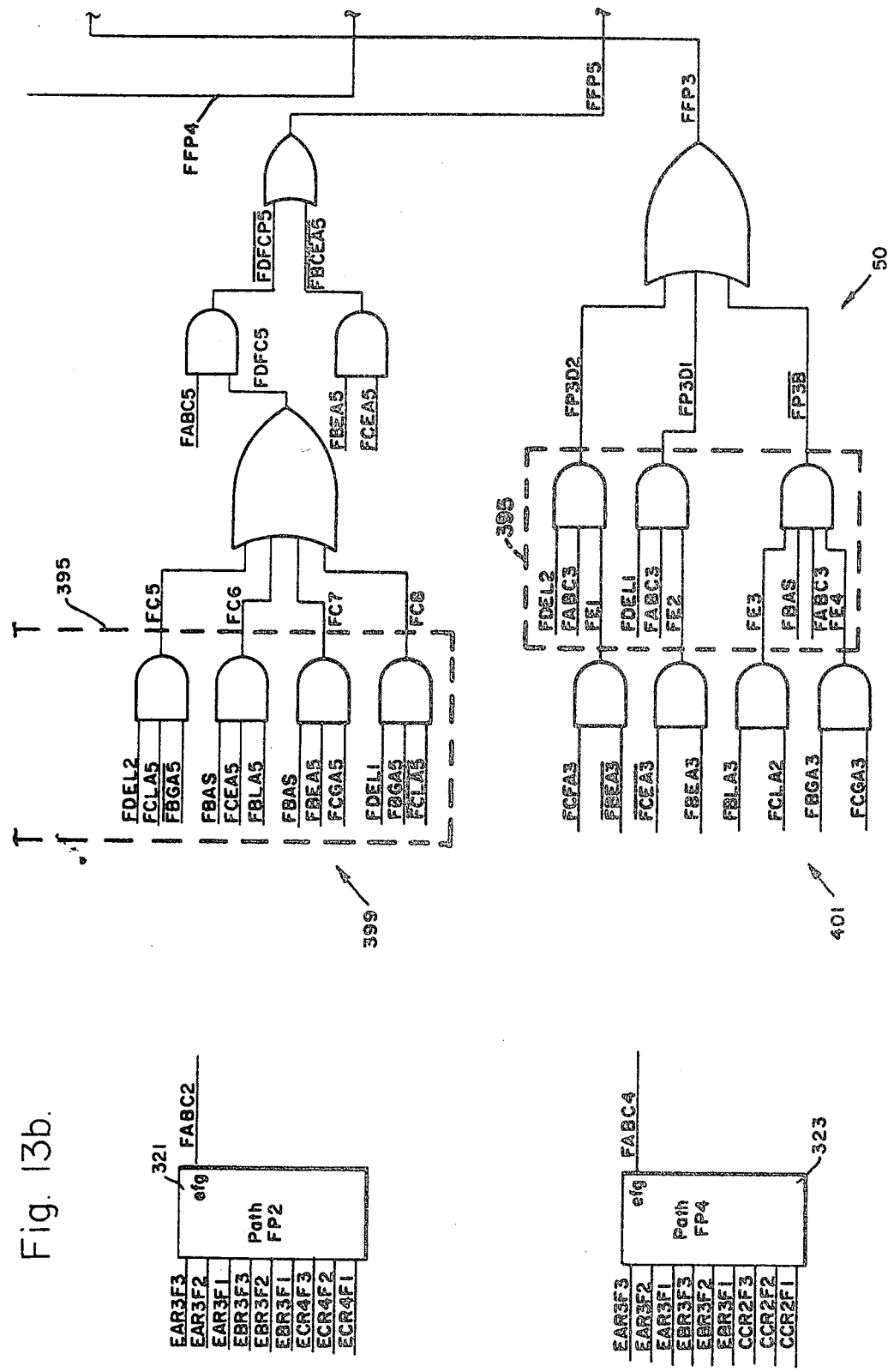
Figure 13C:
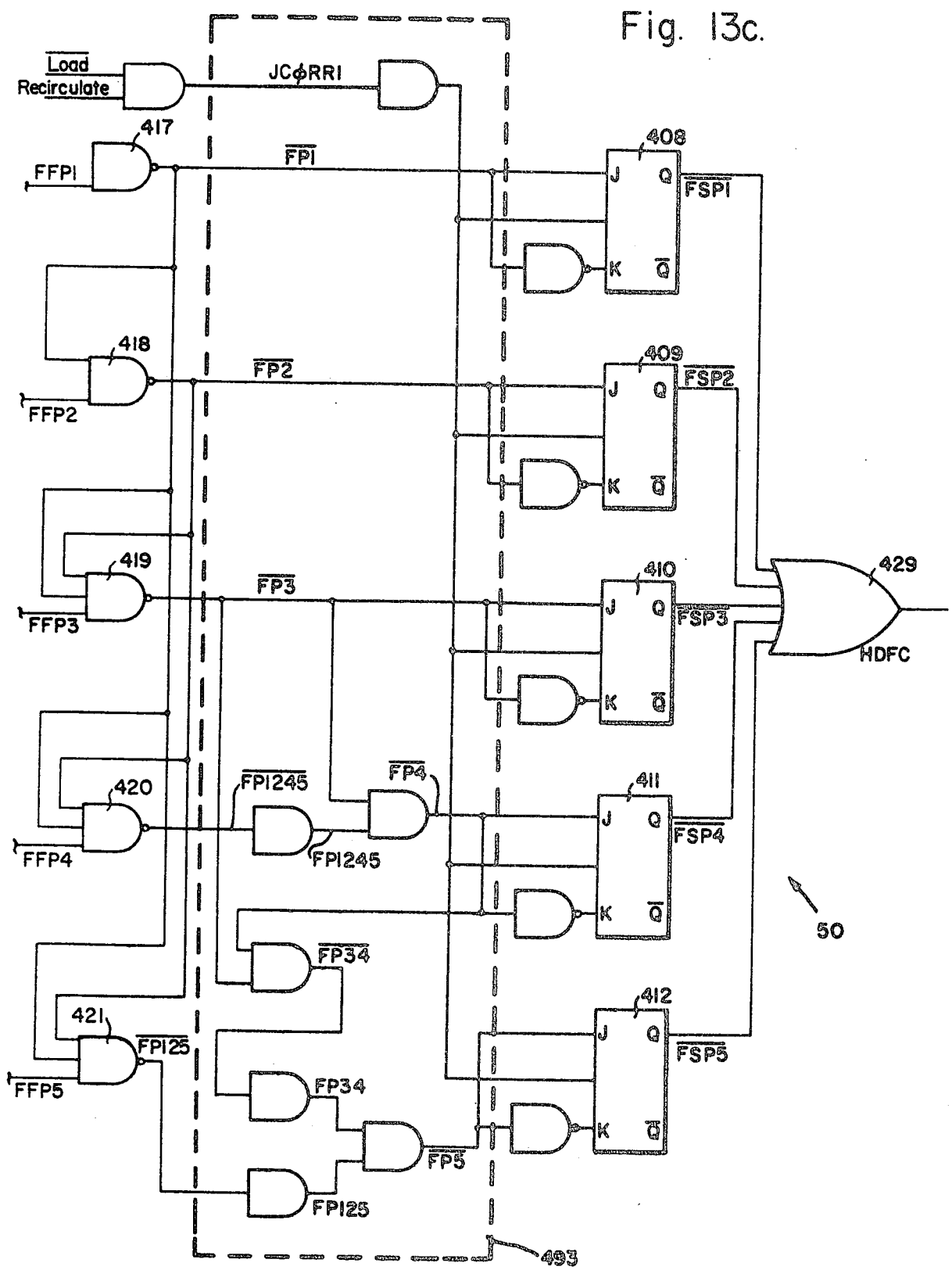

Referring now to FIGS. 13a, 13b and 13c, the doppler frequency correlator 50 in accordance with the invention will be explained in further detail. The five paths FP1 to FP5 of FIG. 10 are respectively shown in comparison units 320 to 324, each of which provides a comparison of the amplitude or value of the filter number in that path in response to inputs A, B and C respectively representing the oldest to the newest dwell data as shown in FIG. 10. The input signals to the comparison units 320 to 324 are received from a correlation window 46 of FIG. 1 which includes A, B and C storage windows each storing data for three range intervals. For path FP1, comparator 320 responds to EBR4F3, EBR4F2 and EBR4F1, to EAR4F3, EAR4F2, EAR4F1, ECR4F1, ECR4F2 and ECR4F3 where BR4, AR3 and CR4 represents the range bin boxes of FIG. 10 and the corresponding window flip flop of correlation window 46 of FIG. 1, and F1, F2 and F3 represent the filter bit numbers of the three bit filter number in each range bin. The first C or E designation is for further identifying the terms and the second designation A, B or C defines the register of FIG. 9a as well as the correlation window registers of FIG. 1. The R2, R3 and R4 designates the three ranges (FIG. 12) used in the correlator and derived from the A, B and C outputs of FIG. 9a at the window registers of window 46 of FIG. 1. The F1, F2, and F3 represents the filter bit numbers of each register output at each range. Thus the terms applied to the comparators 320 to 324 are all derived from the window storage flip flops of the correlator 46 of FIG. 1. A filter number in a range bin indicates that a target signal in that range bin has met the threshold criteria. The path 1 comparator 320 provides a comparison for each two binary input terms by suitable full adder and logic arrangement and may utilize the following arrangement to determine when two filter number terms E and F are equal when E is greater than F and when E is less than F. The two filter numbers are applied to a one's complement comparator where in the illustrated arrangement F is complemented and then added to E. A 111 indicates equality, 1000 indicates E>F and 110 indicates E<F. The following are illustrative examples.

| | | |
|---|---|---|
| E = 3 | E − 011 | |

-continued

| | | |
|---|---|---|
| F = 3 | F − 100 | |
| | 111 | |
| | | E = F |
| E = 2 | E − 010 | |
| F = 2 | F − 101 | |
| | 111 | |
| E = 3 | E − 011 | |
| F = 2 | F − 101 | |
| | 1000 | |
| | | E > F |
| E = 2 | E − 010 | |
| F = 1 | F − 110 | |
| | 1000 | |
| E = 3 | E − 011 | |
| F = 4 | F − 011 | E < F |
| | 110 | |

For convenience of explanation relative to FIG. 13 the =, > and < data is designated with the input terms $h$, $i$, $j$ for the paths FP1, FP3 and FP5 and with the input terms $e$, $f$, $g$ for the paths FP2 and FP4. The comparator 320 generates a signal FABC1 when all of the input filter numbers A, B, C are equal in path 1, FBGA1 when the filter number in bin B is greater than A in path 1, FBLA1 when the filter number in bin B is less than that in A in path 1, FBEA1 when the filter number in B bin is equal to the filter number in bin A in path 1 and FCGA1 when the filter number in bin C is greater than the filter number in bin A in path 1. Also, the comparator 320 generates signals FCLA1 when the filter number in bin C is less than the filter number in bin A in path 1, FCEA1 when the filter number in bin C is equal to the filter number in bin A in path 1 and inverted terms $\overline{FBLA1}$ and $\overline{FCGA1}$.

In path FP2, the comparator 321 responds to signals EAR3F3, EAR3F2 and EAR3F1, to signals EBR3F3, EBR3F2 and EBR3F1, and to signals ECR4F3, ECR4F2 and ECR4F1 representing the three bit filter numbers in the boxes AR3, BR3 and CR4 of FIG. 10. For path FP2 only the comparison FABC2 is required which indicates the three filter numbers are equal.

In path FP3, the comparator 322 responds to signals EBR4F3, EBR4F2 and EBR4F1 for the BR4 bin to signals EAR3F3, EAR3F2 and EAR3F1 for the AR3 bin to signals ECR3F1, ECR3F2 and ECR3F3 for the CR3 bin. The path 3 comparator generates signals FABC3 when the filter numbers in the three dwell paths are equal, FBGA3 when the filter number in bin B is greater than A, FBLA3 when the filter number in bin B is less than A, FBEA3 when the filter number in bin position B is equal to A and FCGA3 when the filter number in bin C is greater than the filter number in bin A. Comparator 322 also develops FCLA3 when the filter number in the bin C is less than at A and FCEA3 when the filter number in the bin C is equal to the filter number at bin A. The inverted terms $\overline{FBGA3}$, $\overline{FBLA3}$, $\overline{FBEA3}$ and $\overline{FCEA3}$ are also provided for path 3 by suitable inverters.

For path FP4, comparator 323 responds to signals EAR3F3, EAR3F2 and EAR3F1 for bin AR3, to signals EBR3F1, EBR3F2 and EBRF3 for bin BR3 and to signals CCR2F3, CCR2F2 and CCR2F1 for the reference bin CR2 to generate the signal FABC4 when the three input filter numbers are equal in path 4.

For path FP5 the comparator unit 324 receives signals CBR2F1, CBR2F2 and CBR2F3 for bin BR2, signals EAR3F3, EAR3F2 and EAR3F1 for bin AR3 and signals CCR2F3, CCR2F2 and CCR2F1 for bin CR2. The comparator 324 generates signals FABC5 when the three input filter numbers are equal in path 5, FBGA5 when the filter number in dwell B is greater than in A, FBLA5 when the filter number in the bin in dwell B is less than in A, FBEA5 when the filter number in the bin in dwell B is equal to bin dwell A, FCGA5 when the filter number in the bin in dwell C is greater than in dwell A, FCLA5 when the filter number in the bin in dwell C is less than in A and FCEA5 when the filter number in the bin in dwell C is equal to the number in the bin in dwell A. The comparator 324 also by suitable inverters provides signals $\overline{FBGA5}$ and $\overline{FCLA5}$.

Figure 14:
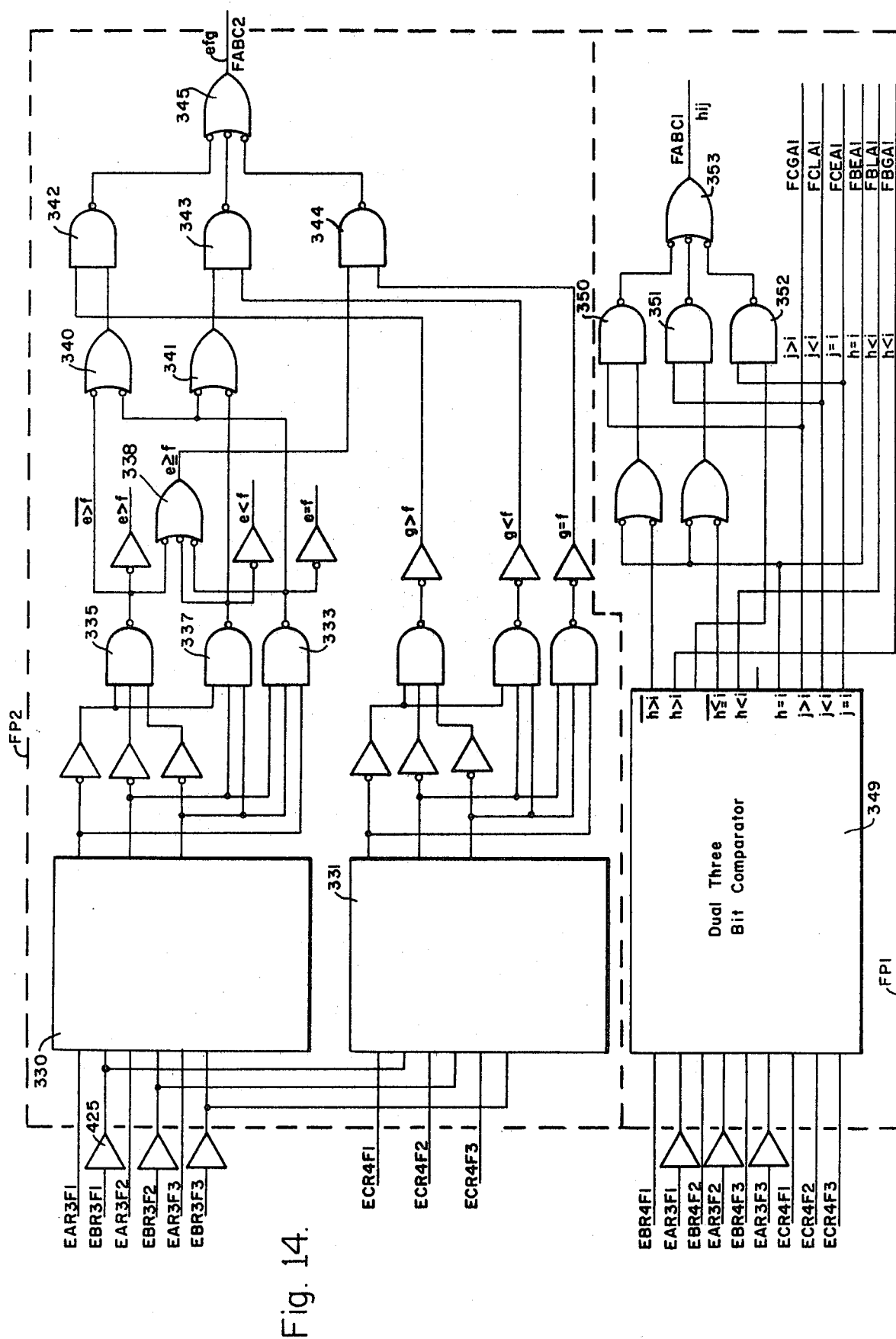
FIG. 14 is a schematic circuit and block diagram showing further detail of a portion of the range path comparison of the correlator of FIG. 12.

Referring now to FIG. 14, the operation of the comparators will be further explained before proceeding on with the multiplex and the remainder of the correlation unit 50. Path FP2 three bit correlator includes full adder units 330 and 331 with the unit 330 responding to the AR3 and BR3 range bins and the adder unit 331 responding BR3 and CR4 range bins. For simplicity of explanation since the mechanization of FP2 and FP1 comparators is applicable to the other comparators, the AR3, BR3 and CR4 range bin data for comparator FP2 will be designated e, f and g and the AR3, BR3 and CR4 bin data for comparator FP1 will be designated h, i and j. From the previous adder logic it can be seen that when the three bits of e and f are summed to the value 111 AND gate 333 generates a signal through an inverter indicating that $e = f$. When the two numbers add to 100 in the least significant three places an AND gate 335 provides a signal $e > f$ through an inverter and when the three filter numbers add to 110 an AND gate 337 provides a signal through an inverter indicating $e < f$. An OR gate 338 develops a signal $e \geq f$ (greater than or equal to.) OR gates 340, 341 and 345 and AND gates 342, 343 and 344 respond to the terms to provide the signal FABC2 in accordance with the equation FABC = $(A \geq B)(A \geq C) + (A \leq B)(A \leq C)$. In a similar manner gates are provided at the output of the adder 331 to generate the signals $g > f$, $g < f$ and $g \leq f$. Although for path PF2 only the term FABC2 is required, the generation of the other terms is shown to illustrate the operation of the other comparator units 320, 322 and 324.

For path FP1, a dual three bit comparator and adder unit 349 similar to the adder units 330 and 331 and associated comparator logic for path FP2 is provided to generate the signals indicated at the output thereof, in response to the filter numbers in range bins AR3, BR4 and CR4. In a manner similar to that in path FP2, AND gates 350, 351 and 352 and OR gate 353 generate signals FABC1. The other terms provided by the comparator 320 are developed by the comparator and adder unit 349. It is to be understood that all of the comparator units are similar to the two shown in FIG. 14 with the appropriate terms being utilized to generate the signals as indicated in FIGS. 13a, 13b and 13c.

The multiplexing operation will now be explained which is utilized to maintain PRF order and the processing order consistent without excessive transfer of the data in the dwell 3, dwell 2, dwell 1 storage units or repsective units 40, 42 and 44. It is to be noted that when large numbers of data bits are carried with each filter number, representing a target and its characteristics, transfer of data would be excessive and require a substantial time delay and additional equipment. In the system of the invention, only the filter number and amplitude data is required to be transferred to provide the determination of a valid target. The minimum amount of data that is required for the correlation is gated to the proper correlation logic by the multiplexer unit 302. An illustration of the timing, is shown by the following table:

| TRANSMIT PRFs | A STORE | B STORE | C STORE | |
|---|---|---|---|---|
| BASIC | | | BASIC | BLANK |
| Δ1 | | | Δ1 | BLANK |
| Δ2 | BASIC (short) | Δ1 Med. | Δ2 long | START PROCESSING |
| BASIC | Δ1 (med.) | Δ2 Long | BASIC short | |
| Δ1 | Δ2 (long) | BASIC short | Δ1 med. | |
| Δ2 | BASIC (short) | Δ1 | Δ2 | |
| BASIC | Δ1 (med.) | Δ2 | BASIC | |
| Δ1 | Δ2 (long) | BASIC | Δ1 | |
| >6 | BASIC (short) | Δ1 | Δ2 | |
| BASIC | Δ1 (med.) | Δ2 | BASIC | |
| | Δ2 (long) | BASIC | Δ1 | |

| TRANSMIT PRFs | PRF ORDER | CORREL MULTIPLEX TIMING |
|---|---|---|
| BASIC | | |
| Δ1 | | |
| Δ2 | ORDER - 1 | FDEL2 |
| BASIC | ORDER - 2 | FBAS |
| Δ1 | ORDER - 3 | FDEL1 |
| Δ2 | ORDER - 1 | FDEL2 |
| BASIC | ORDER - 2 | FBAS |
| Δ1 | ORDER - 3 | FDEL1 |
| Δ2 | ORDER - 1 | FDEL2 |
| BASIC | ORDER - 2 | FBAS |
| | ORDER - 3 | FDEL1 |

Transmission during each dwell is designated by Basic, Δ1 and Δ2 pulse repetition frequencies with the contents of the dwell 1 storage, dwell 2 storage and dwell 3 storage indicated during each transmit and return period. The C storage register receives the transmitted PRF during each transmit period. It is to be noted that blanking is provided so processing is not started until the third dwell period and the dwell registers are loaded. Depending on the position of the transmit PRF in the three storage registers, PRF order is provided which may be designated orders 1, 2 or 3. For controlling the multiplexing, three signals FBAS, FDEL1 and FDEL2 are generated for each of the respective orders 1, 2 and 3 and are utilized to switch the data from corresponding dwell storage registers to the appropriate logic to maintain the paths of FIG. 10 so that processing is always performed by the correlator in PRF order 1.

Referring principally to FIG. 13a to 13c, multiplex unit 395 which forms the multiplexer 302 responds to the timing signals FBAS, FDEL1 and FDEL2, depending on the frequency transmission of the dwell period. Paths FP1 to FP5 are generated by the respective gating units 398 to 402, with the gating unit 398 including AND gates 404 to 407 which apply respective terms $\overline{HB1CGA}$, $\overline{HBECLA}$, $\overline{HBGCEA}$ and $\overline{HBLCEA}$ to an OR gate 423 which generates the term HDFCB. The gate 404 responds to the PRF order term FDEL2 and the terms FCGA1 and $\overline{FBLA1}$, the gate 405 responds to the basic order term FBAS and to the comparison terms FBEA1 and FCLA1, the gate 406 responds to the basic order term FBAS and to the comparison terms FBGA1 and FCEA1, and the gate 407 responds to the order term FDEL1 and to the filter comparison terms FBLA1 and $\overline{FCGA1}$. AND gates 413 and 414 respectively respond to the terms FABC1 and HDFCB and to the terms $\overline{FBEA1}$ and $\overline{FCEA1}$ to provide the respective terms $\overline{FDFCP1}$ and $\overline{FBCEA1}$ which are applied to the AND gate 416. The AND gate 416 develops the term FFP1 indicating a correlation to one of the filter correlation paths of the range path FP1 of FIG. 10 and in accordance with the previously discussed logical equation. Each of the terms FFP2 to FFP5 are generated in a similar manner in accordance with the mechanization of the previously listed logical equations as shown and will not need to be explained in further detail. The AND and OR gate symbols represent conventional diode logic functions except where a circle is added at the output of an AND gate to indicate a NAND gate.

Each of the signals FFP1 to FFP5 is applied to respective NAND gates 417 to 421. The signals are then applied through a priority network, 493 which includes the AND gates 417 to 421 and which selects the priorty of the terms FFP1, FFP2, FFP3, FFP4 and FFP5 in that order with a correlation term $\overline{FP1}$ being applied to a storage unit or flip-flop 408 when FFP1 is true, correlation term $\overline{FP2}$ being applied to a storage unit 409 when $\overline{FP1}$ is true and FFP2 is true, a correlation term $\overline{FP3}$ being applied to a storage unit 410 when $\overline{FP1}$ and $\overline{FP2}$ are true, and FFP3 is true a correlation term $\overline{FP4}$ being applied to a storage unit 411 when $\overline{FP1}$ to $\overline{FP3}$ are true and FFP4 is true and $\overline{FP5}$ being applied to a storage unit 412 when $\overline{FP1}$ to $\overline{FP4}$ are false and FFP5 is true. A priority term is thus stored only from a selected one of the correlations indicated by the term FFP1 to FFP5. Because the system can provide correlation in more than one path and it is desired to only report one target, this priority order was selected with the closest range having the highest priority. The terms are gated into the storage units 408 to 412 in response to a correlation gate term JCφRR1. The correlated data which is stored in the storage unit for one clock period is then applied to an OR gating structure 429 which gates the data to the output lead. In some arrangements in accordance with the invention the signals from the storage units may be all applied to further processing units. The OR gate 429 generates a target signal HDFC.

Figure 15:
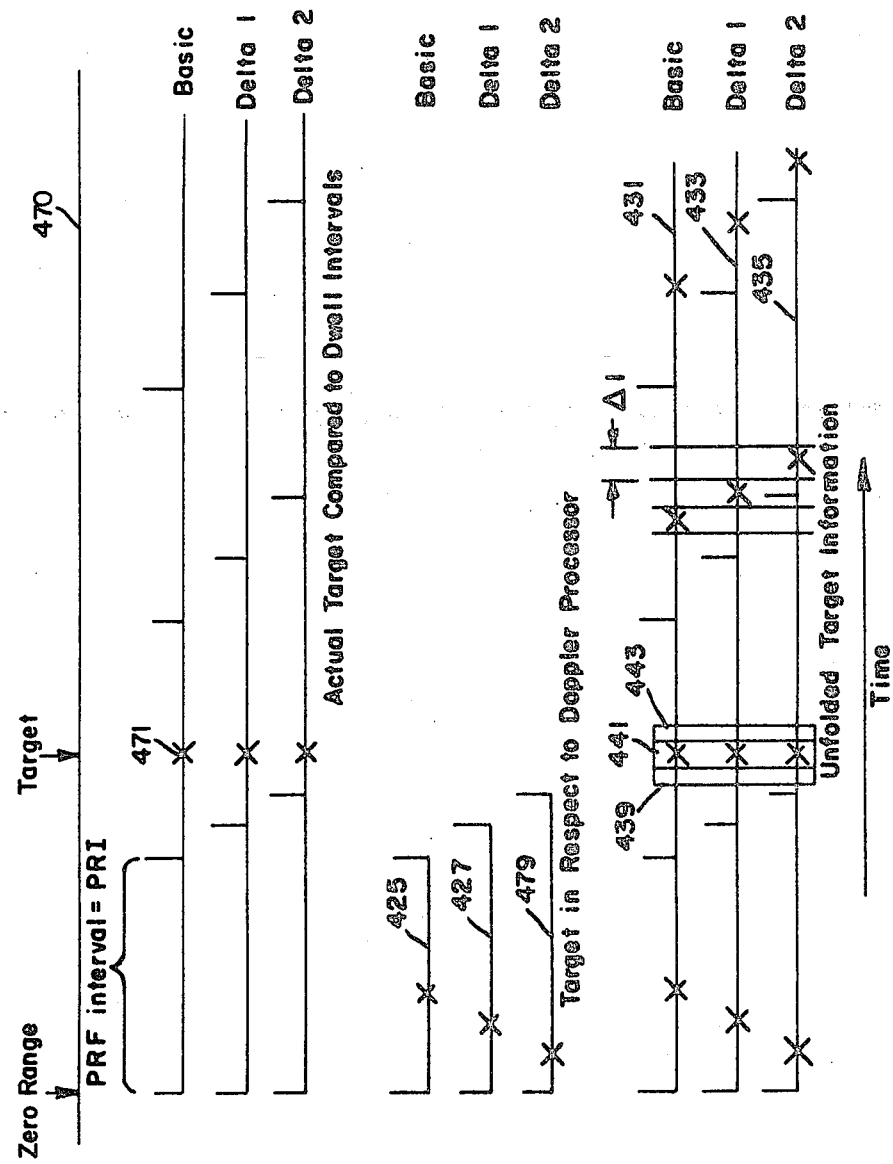
FIG. 15 is a schematic diagram showing the target and the PRF intervals as a function of time for illustrating the actual target compared to dwell intervals, the target as seen in the ambiguous range interval from the doppler processor and the unfolded target information.

Referring now to FIG. 15, the actual range to a target is shown in a line 470 and the actual target as compared to basic, Δ1 and Δ2 dwell intervals is shown with an ambiguous target return in the second pulse repetition interval or PRI (1/PRF) being indicated at 471. The target as seen in the ambiguous range interval in the doppler process is shown by lines 425, 427 and 479 for the three PRF intervals and the returns are not aligned. The unfolded target information is shown by lines 431, 433 and 435 with the three target returns from three adjacent dwells, correlation in range at the true target range. The delta 1 (Δ1) or range bin intervals 439, 441 and 443 are shown to generally indicate the amount of variation in range that is allowed in accordance with the paths of FIG. 11. The system of the invention not only considers the range intervals but utilizes the doppler filter numbers as criteria to detect a valid target in a plurality of paths. Without utilizing the filter number, different targets of different velocities would appear at the same range bin, with the result that invalid targets would be detected. The PRF is equal to (1/number of cells) × (machine rate). Thus if the machine rate is 1 mHz (megahertz) and the number of cells as well as the PRI for the three different dwells Basic, Δ1 and Δ2 is 1000, 1005 and 1011, the three respective PRFs are a function of (1/1000), (1/1005) and (1/1011). In this illustration, the basic PRF is jittered by the time interval of 0, 5 or 11 range bins. Although the illustrated system utilizes 6 recirculations to unfold the ambiguous data, any number as determined by the desired range of interest and the number of transmitted fill pulses may be utilized.

Figure 16:
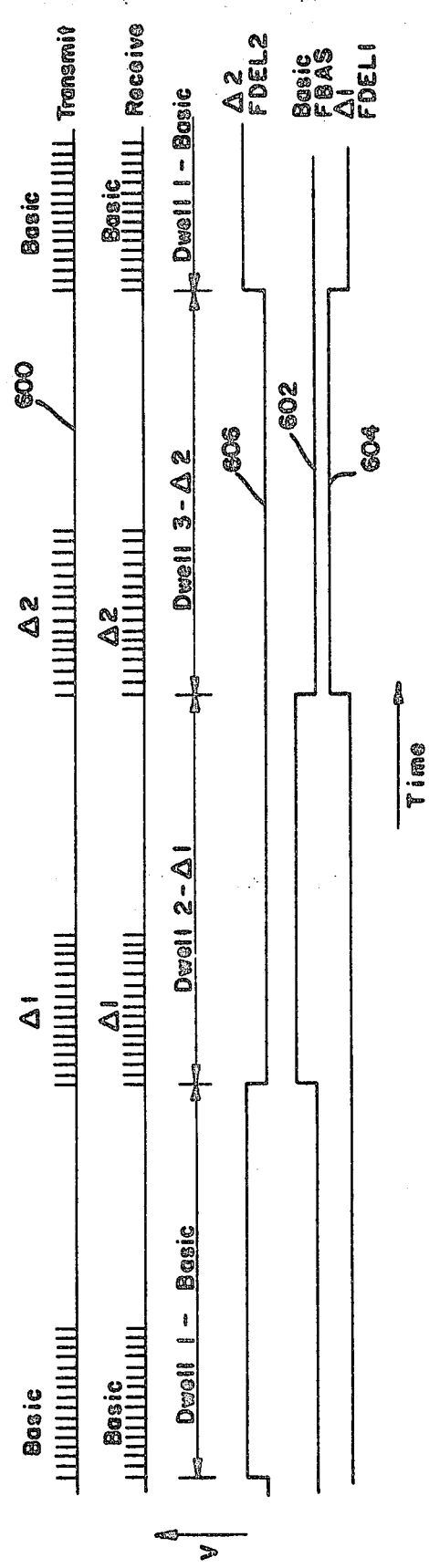
FIG. 16 is a schematic diagram of voltage as a function of time for explaining the transmit and receive timing of the system of FIG. 1.

Referring now to the waveforms of FIG. 16 as well as to FIG. 1, the radar system transmits burst of pulses Basic, Δ1 and Δ2 as shown by a waveform 600 at respective Basic, Basic + Δ1 and Basic + Δ2 PRFs. Each burst in the illustrated system may include sixteen transmitted pulses including 6 range fill pulses and 2 MT1 pulses which are accumulated in the doppler processor. For the Basic, Δ1 and Δ2 dwell periods, respective pulses 602, 604 and 606 define the overall processing interval. Referring now also to FIG. 17, the PRF basic interval, PRF Δ1 interval, PRF Δ2 interval of respective pulses FBAS, FDEL1 and FDEL2 are defined by waveforms 610, 612 and 611 which periods includes the transmitting, receiving and doppler processing periods. For control of the dwell storage register C the sequence includes loading the register as shown by a waveform 614. When Δ1, Δ2 and basic data are loaded therein, the system correlates in response to a pulse as shown by a waveform 616, recirculates as shown by a waveform 618, transfers as shown by a waveform 619 and realigns registers A and B as shown by a waveform 620. In order to provide the realignment the number of clock pulses for each register is provided as O, MΔ1 and M(Δ1+Δ2) to the respective short, medium and long registers where M is the number of fill pulses. In some arrangements if dynamic registers are utilized, the clock rate may be reduced to one-half for the time required to align the registers to the end of the dwell as indicated at 630 for clock gates A and B of respective waveforms 622 and 623. The end of dwell is defined by the synchronization pulse of a waveform 630, the doppler processor and MT1 period is defined by the pulse of the waveform 632, and the transmit and receive periods are shown by a waveform 634, at the start of each load period the registers have their length established in response to the FBAS, FDEL1 and FDEL2 signals defining the PRF order.

Thus there has been described an improved correlator that utilizes storage to accumulate three adjacent dwells of ambiguous range centroided information, align them so that corresponding range bins from each dwell can be observed simultaneously and recirculate the information to resolve the ambiguous range. The dwell storage consists of three sets of dynamic registers (designated A, B, and C), capable of holding all of the ambiguous data in three adjacent dwells on a range bin by range bin basis. Each set of registers is loaded and unloaded serially with respect to range and programmed by the timing unit to adjust its bit length equal to 4 MHz/PRF where 4 MHz is the processing clock rate and the PRF in the illustrated system is 4000. Three dwells of data must be loaded before a valid processing period can begin. The PRF with each jitter length is transmitted for one dwell period, with the three jitter lengths being sequenced at the beginning of each new dwell period on a Modulo 3 basis. After the three dwell storage registers have been loaded with a PRF + jitter the unfolding process begins. It is to be noted that the system is not limited to any single radar frequency or to any burst pattern and may respond to a plurality of bursts of pulses at each PRF.

A load period, a correlation period, a transfer period, and a realignment period is required for each dwell. During the load period with the length of the registers established the data from the most recent dwell is entered into the C register. During the correlation period the data in all three sets of registers is serially shifted and recirculated on a range bin by range bin basis beginning with range bin one of each dwell. The data is recirculated a number of times equal to the number of intervals or fill pulses in a dwell. After recirculation is completed, the data from C is transferred to B and the data from B is transferred to the A register. During the recirculation the data now in B and A became misaligned with respect to one another and with respect to range bin one of the register. This data is realigned, range bin one of the data is placed in range bin one of the register, by varying the number of clocks as determined by the timing unit. During correlation the data is recirculated within its own register at its particular length. As it is recirculated the data from corresponding range bins in each of the three dwell storage registers is serially, by range bin, loaded into a 3 range bin storage window which allows correlation to be attempted over 3 contiguous range bins of data. The correlator range-azimuth profiles allow for a target that is either opening, closing, or static in range over the dwells of interest. Because of velocity limitations a target will never move more than one range bin in three dwells.

The purpose of the filter correlation is a preliminary check to determine if data being observed over a particular correlation path is from the same target. It is assumed that targets with the same filter number (velocity) are the same target. Hence, the same filter number in the three range bins of a particular path is the first criteria for a correlation. One problem that arises with filter number correlation is that the same target velocity may cause outputs in adjacent filters because of PRF jitter. There are 17 possible combinations for which the filter number can correlate. However, this situation occurs only if the dwell sequence is PRF ordered, that is, A, B and C registers must contain Basic, Δ1, and Δ2 data in that order. If the PRF sequence is changed the multiplexer retains the order of the correlation paths so that the system operates with a minimum of data transfer and equipment. The system provides a reliable determination that a target occurs and the unambiguous range of that target.

The principles of the invention are applicable to track while scan radar or to radar utilizing any type of track such as one utilizing beam pointing.

What is claimed is:

1. A range determining system responsive to a doppler filter bank having a plurality of doppler filters, said system receiving radar transmission signals for a plurality of dwells over a plurality of range bins, said filter bank providing a filter number signal when a target return signal occurs in a doppler filter, each filter number signal identifying a doppler filter of said bank comprising:

first, second and third storage registers responsive to the doppler filters to store the filter number signals in each range bin for three radar dwells;

recirculating control means coupled to said storage registers for controlling said registers to recirculate the stored filter number signals in said first, second and third registers to unfold target information; and correlator means having a plurality of correlators responsive to said stored filter number signals in said storage registers for detecting an unfolded target signal.

2. The system of claim 1 in which said system includes means to transmit a plurality of pulses for each dwell, each with a different pulse repetition frequency repetitive on a modulo 3 basis and in which said recirculating control means includes means to control the length of said storage registers.

3. The system of claim 1 in which the doppler filter number signals from each dwell are transferred to said first register and further including transfer control means coupled to said storage registers to transfer the filter number signals derived from each dwell between said first, second and third storage registers, during each dwell period.

4. The system of claim 3 in which said correlator means includes means for providing a plurality of range-ozimuth paths for a selected number of adjacent dwells and means for detecting a target when a filter number signal occurs in one of said paths.

5. The system of claim 4 in which said means for providing a plurality of range-azimuth paths includes means for responding to filter number signals varying by one adjacent doppler filter number to detect an unfolded target.

6. The system of claim 5 in which said means for providing a plurality of range-azimuth paths provides 17 paths for detecting a target.

7. The system of claim 1 in which multiplexing means is included in said correlator means for applying the filter number signals from said first, second and third storage registers to said correlator means in a predetermined pulse repetition frequency order.

8. A system for detecting unambiguous target range over a plurality of range bins in a radar system transmitting a plurality of bursts of pulses, each burst during a burst interval, with each sequential burst being at a different pulse repetition frequency and being repetitive on a modulo 3 basis, the radar system receiving return pulses comprising:

doppler processing means having a plurality of filters for providing doppler filter number signals for each filter responding to the reception of said return pulses;

first, second and third recirculating storage means coupled in series, with said first storage means coupled to said doppler processing means for receiving and storing said filter number signals;

first control means coupled to said recirculating storage means for transferring the stored filter number signals between the first, second and third storage means after each burst interval;

second control means coupled to said recirculating storage means for recirculating the stored filter number signals on a range bin basis in each storage means; and correlating means responsive to the stored signals recirculated in said storage means for determining as a function of doppler filter number, range bin number and storage means number, an unambiguous target range.

9. The system of claim 8 in which multiplexing means is included in said correlating means to provide said doppler signals in a predetermined pulse repetition frequency order from said first, second and third storage means to said correlating means as the pulse repetition frequency order changes in said first, second and third storage means.

10. The system of claim 9 in which said correlating means includes means for detecting the presence of at least one of a predetermined number of range versus dwell paths provided over filter numbers varying positively and negatively by one number.

11. The system of claim 10 in which said correlating means includes 17 predetermined paths.

12. The system of claim 11 including threshold means at the input to said first storage means so that doppler filter number signals are only provided when a predetermined threshold is exceeded.

13. The system of claim 12 including range counting means responsive to the detecting of a target by said correlating means to provide unambiguous range of said target.

14. An unambiguous radar range determining system responsive to transmitted bursts of pulses with each burst representing a dwell period and being transmitted at different pulse repetition frequencies on a modulo 3 basis, said system defining a plurality of range bins and including a doppler filter bank having a plurality of frequency adjacent doppler filters responding to signals derived from radar return signals to provide filter numbers comprising:

first, second and third recirculating shift registers coupled in series, with the first register coupled to said doppler filter bank for receiving data including filter numbers during each dwell period;

control means coupled to said recirculating shift registers for controlling said registers during each dwell period to load said first register, to recirculate the data in said first, second and third registers and to transfer the data in sequence between said first, second and third registers with the data received in said third register during the previous dwell period being removed therefrom, said registers storing data in three dwell orders;

multiplexing means coupled to said first, second and third registers to provide the data in a predetermined one of said three dwell orders;

correlator means coupled to said multiplexing means to receive said data in said predetermined order and having a plurality of range versus dwell detecting paths responding to filter numbers for detecting the presence of an unfolded target signal in each range bin; and priority means responsive to detection of unfolded target signals by said correlator means to provide an unambiguous target range signal.

15. The combination of claim 14 in which said correlator means includes 17 range versus dwell detecting paths over a range of doppler filter number variations of plus or minus one adjacent filter number.

* * * * *